(12) United States Patent
Bauersachs

(10) Patent No.: US 12,128,470 B2
(45) Date of Patent: Oct. 29, 2024

(54) PRODUCTION SYSTEM, PRODUCTION MODULE, METHOD FOR OPERATING AND SETTING UP A PRODUCTION LINE, AND METHOD FOR PRODUCING A WORKPIECE

(71) Applicant: Langenstein & Schemann GmbH, Coburg (DE)

(72) Inventor: Lothar Bauersachs, Weidhausen (DE)

(73) Assignee: LANGENSTEIN & SCHEMANN GMBH, Coburg (DE)

( * ) Notice: Subject to any disclaimer, the term of this patent is extended or adjusted under 35 U.S.C. 154(b) by 1012 days.

(21) Appl. No.: 16/970,057

(22) PCT Filed: Feb. 14, 2019

(86) PCT No.: PCT/EP2019/053691
§ 371 (c)(1),
(2) Date: Aug. 14, 2020

(87) PCT Pub. No.: WO2019/158650
PCT Pub. Date: Aug. 22, 2019

(65) Prior Publication Data
US 2021/0162483 A1 Jun. 3, 2021

(30) Foreign Application Priority Data
Feb. 14, 2018 (DE) .................. 10 2018 103 330.3

(51) Int. Cl.
*B21D 43/02* (2006.01)
*B21D 43/05* (2006.01)
(Continued)

(52) U.S. Cl.
CPC ......... *B21D 43/026* (2013.01); *B21D 43/057* (2013.01); *B21D 43/13* (2013.01);
(Continued)

(58) Field of Classification Search
CPC .... B21D 43/026; B21D 43/057; B21D 43/13; B21D 43/027; B21D 43/14; B21D 37/08;
(Continued)

(56) References Cited

U.S. PATENT DOCUMENTS 3,516,277 A 6/1970 Bracco
4,411,587 A 10/1983 Niki
(Continued)

FOREIGN PATENT DOCUMENTS

CN 105033090 A * 11/2015
DE 69003391 T2 1/1994
(Continued)

OTHER PUBLICATIONS

CN Office Action Mailed on Jan. 24, 2022 for CN Application No. 201980013652.
(Continued)

*Primary Examiner* — Chun Cao
*Assistant Examiner* — Michael Tang
(74) *Attorney, Agent, or Firm* — Workman Nydegger

(57) ABSTRACT

The underlying invention relates in particular to a production module for a production line which is modularly populatable with production modules. In embodiments, provision is made whereby the production module comprises at least one manipulator unit with which a workpiece or a workpiece component is, during the production process, transferable between a deposit position and a production position in the production space of a production module which, for the execution of a production step, is positioned directly downstream in a production direction (R) along the production line.

17 Claims, 10 Drawing Sheets

(51) Int. Cl.
*B21D 43/13* (2006.01)
*B23P 21/00* (2006.01)
*B23Q 7/14* (2006.01)
*B30B 1/32* (2006.01)
*G05B 19/042* (2006.01)

(52) U.S. Cl.
CPC .......... *B23P 21/004* (2013.01); *B23Q 7/1405* (2013.01); *B30B 1/32* (2013.01); *G05B 19/042* (2013.01); *G05B 2219/15006* (2013.01); *G05B 2219/2228* (2013.01); *G05B 2219/2621* (2013.01)

(58) Field of Classification Search
CPC ....... B23P 21/004; B23Q 7/1405; B30B 1/32; B30B 15/30; B30B 15/048; G05B 19/042; G05B 2219/15006; G05B 2219/2228; G05B 2219/2621
USPC ...................... 700/95; 198/346.2; 414/222.07
See application file for complete search history.

(56) References Cited

U.S. PATENT DOCUMENTS

| | | | |
|---|---|---|---|
| 5,337,594 A | 8/1994 | Pettersson et al. | |
| 2002/0194716 A1* | 12/2002 | Berner | H01L 21/6719 29/25 |
| 2003/0158615 A1* | 8/2003 | Weber | B65G 47/5122 700/2 |
| 2009/0012642 A1* | 1/2009 | Mertens | B23Q 7/1405 700/112 |
| 2013/0312479 A1* | 11/2013 | Nagahashi | B21D 22/02 72/352 |
| 2014/0305177 A1* | 10/2014 | Kohno | B21D 24/02 72/21.4 |
| 2014/0305227 A1* | 10/2014 | Johns | B04B 13/00 73/863.01 |

FOREIGN PATENT DOCUMENTS

| | | | | |
|---|---|---|---|---|
| DE | 4233438 A1 | 4/1994 | | |
| DE | 102004029665 A1 | 10/2005 | | |
| DE | 202005013912 U1 | 12/2005 | | |
| DE | 102005004564 A1 * | 8/2006 | ......... | G05B 19/0421 |
| DE | 102007060741 A1 | 6/2009 | | |
| DE | 102008017397 A1 | 9/2009 | | |
| DE | 102013015991 A1 | 3/2015 | | |
| GB | 1126456 A | 9/1968 | | |
| GB | 2082094 A | 3/1982 | | |
| KR | 20110035627 A | 4/2011 | | |
| WO | WO-2014071432 A1 * | 5/2014 | ......... | B09B 3/0041 |
| WO | 2015010724 A1 | 1/2015 | | |

OTHER PUBLICATIONS

PCT Int'l Preliminary Report on Patentability for PCT/EP2019/053691, mailed on Aug. 27, 2020, 36 pages (17 pages of English Translation and 19 pages of Original Document).

Office Action received for European Patent Application No. 19706464.5, mailed on Sep. 15, 2023, 7 pages.

* cited by examiner

PRODUCTION SYSTEM, PRODUCTION MODULE, METHOD FOR OPERATING AND SETTING UP A PRODUCTION LINE, AND METHOD FOR PRODUCING A WORKPIECE

CROSS-REFERENCE TO RELATED APPLICATIONS

The present invention is a 35 U.S.C. § 371 U.S. National Stage of PCT Application No. PCT/EP2019/053691, filed on Feb. 14, 2019, which claims priority to German Patent Application No. 10 2018 103 330.3, filed Feb. 14, 2018. The entire content of each of the aforementioned patent applications is incorporated herein by reference.

BACKGROUND OF THE INVENTION

1. Field of the Invention

The present invention relates in particular to a production system, a production module, a method for operating and setting up a production line, and a method for producing a workpiece. The production system may be configured for producing, in particular manufacturing and/or machining, in particular forming, workpieces, for example for the purposes of producing/manufacturing a workpiece from a starting material or blank, such as for example a sheet-metal blank, or from multiple, in particular different starting materials, for example composite materials.

The underlying invention relates in particular to improvements with regard to the construction, maintenance, operation, workpiece throughput and operational set-up of a production system, for example of a forming plant, for example of a press line.

SUMMARY OF THE INVENTION

Embodiments of the underlying invention will emerge in particular from the appended patent claims and from the embodiments and examples described below.

In one embodiment, a production module for executing at least one production step in a method for producing a workpiece is provided, wherein the production module is configured for integration into a modular production system with multiple production modules arranged successively in relation to one another along a production line. The production modules may comprise production spaces which may form (or: define) an, in particular continuous, production channel along the production line. In particular continuous or cyclic workpiece transport between individual production positions (or: production stages) of the production modules may be realized by means of the production channel, for example by means of one or more manipulator units. The production system may for example and in particular be a press line, and the production module may for example be a press module. Statements made below regarding the production system and production module apply correspondingly to a press line and press module, and vice versa.

A production channel may for example comprise at least two, in particular separate, production spaces of two production modules which are arranged in direct succession, and in particular spaced apart, along the production line. In embodiments, the production channel may encompass or be formed by the production spaces of all production modules of a production system. In particular, in embodiments, at least one production module of the production system may comprise a production space which is spatially separate from the production spaces or production stages of further production modules of the production system and in which a, in particular a single, respectively specific production operation may be performed independently of production operations of the further production modules.

Thus, at least one of the production modules differs from known production systems, for example multi-stage presses, in which multiple production operations or production stages are performed in one common (coherent) production space.

The expression "production line" is intended, in particular, to encompass a successive sequence of production steps (or: production positions, production stages). Here, the expression "line" is not to be interpreted in a restrictive sense as meaning that the individual production steps of the production line are arranged (or: positioned) linearly (one behind the other) from a spatial aspect. In other words, the path of the workpieces along the production line may deviate from a substantially linear movement path, and may for example involve bends. However, in embodiments, it is possible for the production line to define a substantially linear movement path, and, for example, to form along the production line a production channel which is linear from a spatial aspect.

In embodiments, the production module comprises at least one manipulator unit which comprises, upstream or downstream of the production module in the direction of the production line, a deposit system with at least one deposit unit for the depositing a workpiece or a workpiece component thereon.

The deposit system is configured such that a workpiece or a workpiece component is, during the production process, transferable between a deposit position of the deposit unit and a production position in the production space of a production module which, for the execution of a production step, is positioned directly downstream in a production direction along the production line.

In other words, the proposed production module may be operated such that the workpiece is firstly transferred from the production position, that is to say from the production space, to the deposit unit, and is then transferred in the production direction from the deposit unit along the production direction into a downstream, in particular a directly downstream, production position, or into a downstream production space.

A deposit position may, by contrast to a working position, be understood in particular to mean a position within the production line at which a workpiece may be deposited outside a production space of a production module that is configured for actively processing the workpiece. The deposit position may thus be referred to as passive in relation to an active workpiece processing operation or active workpiece production operation, in particular in the sense of a technical refinement of the workpiece in the course of production in the production spaces. Although the deposit position may be situated within the production line, the deposit position however does not form a production position in a production space of a production module within the meaning used here.

Provision of the deposit unit and deposit position yield advantages in particular with regard to production flexibility and/or with regard to the setting-up, maintenance and configuration of a production system with predefined production stages. For example, the deposit position permits additional manipulating operations, such as for example rotating, and/or operations such as transferring-in or transferring-out of workpieces or workpiece components (for example in the context of additive manufacturing). Furthermore, the deposit unit permits a configuration in which intermediate production steps, in particular additional intermediate production steps, may be integrated in a flexible manner in the region of the deposit position or outside the production line without the need to modify the overall configuration of the production modules. Furthermore, the proposed deposit system facilitates the transfer, in particular the delivery, of workpieces or workpiece components between adjacent production modules in the production direction along the production line.

In embodiments, the manipulator unit may comprise at least one displacement carriage which is mounted so as to be displaceable parallel to the wide side of the production module and transversely, in particular laterally, with respect to the production direction along the production line, and which is positioned upstream or downstream of the working space in the production direction along the production line. The displacement carriage may be designed such that, by means thereof, a workpiece or a workpiece component, which is, in terms of production, for example designed for being connected to a workpiece, is movable between a deposit position which is assigned to (in particular upstream or downstream of) the production space and at least one further deposit position which is laterally spaced apart from the deposit position, in particular the production line. In particular, the displacement carriage may be designed so as to be movable outward away from the production line or inward toward the production line. For example, with a displacement carriage designed in this way, it is possible for workpieces and/or workpiece components to be transferred into the manufacturing path or transferred out of the manufacturing path. The displacement carriage thus permits a further improvement in the flexibility of production.

In embodiments, the manipulator unit may comprise at least two, in particular exactly two, displacement carriages. The manipulator unit may be configured such that the displacement carriages are, for example by means of a displacement unit, in particular a linear displacement unit, movable between a first position, which is assigned to the production space or to the production line, and at least one second position, which is laterally averted from the production space or the production line. In embodiments, the manipulator unit may be configured such that the displacement carriages may be moved, in particular displaced, in a synchronized fashion. The manipulator device, in particular the displacement carriages, may be configured such that the at least one second position is situated at least partially outside the production channel. Preferably, the displacement carriages are movable laterally and perpendicularly with respect to the production direction along the production line.

By means of a manipulator unit comprising the displacement carriage, it is possible, in particular with regard to the transferring-in and transferring-out of workpieces or workpiece components, to achieve advantageous production flexibility.

In embodiments, the production module may comprise a further manipulator unit which is configured for transferring (or: conveying) the or a workpiece or the or a workpiece component between the deposit position of a deposit unit positioned upstream and/or downstream of the production module or the production space of the production module and the production position in the production space of the respective production module. In particular, the manipulator unit may be designed for a transfer of a workpiece or of a workpiece component into or out of the production space. In interaction with the deposit unit, the transfer to a production module situated immediately downstream in the production direction along the production line may be simplified. Furthermore, additional possibilities in terms of production technology for the manipulation and execution of intermediate production steps arise in combination with the deposit unit.

In embodiments, the at least one deposit system may be attached to a wide side of the production module, in particular to a wide side of a frame of the production module. The wide side is to be understood in particular to mean a side or surface of the production module which is oriented in the direction of the production line, for example of a frame of the production module. An advantage of a coupling in terms of installation technology of the deposit system to the production module may be seen in particular in the fact that an exchange of a production module, and the associated new set-up of a replacement module, in a flexible, modular production system with multiple production modules connected in series may be simplified. In particular, a replacement module together with deposit system may be operationally set up prior to the exchange. For example, it is possible for the production sequences and movement sequences for the production stages encompassed by the replacement module to be set up already before the exchange, such that the outlay (in terms of time) for the actual exchange of the production module in the production line and the resumption of operation or resumption of production may be reduced. In particular, it is possible to train the replacement module outside the production line for those production and/or movement sequences that are required for the production of workpieces after integration into the production line.

In embodiments, the deposit system may be configured to perform separate and/or additional process functions. For example, such a process function may comprise: rotating, marking and performing process and/or quality control on workpieces or workpiece components. Furthermore, the deposit system may be configured, in particular operable, to transfer in and/or transfer out workpieces or workpiece components, that is to say to feed these to the production line or remove these from the production line, for example temporarily or permanently. By means of such additional process functions, advantageous production flexibility may be achieved for the production of workpieces.

In embodiments, the production module may further comprise a mechanical connecting unit (or: connecting interface) for the exchangeable mechanical coupling (or: connection) of the production module to a platform (or: complementary interface) assigned to the production line. The platform may have multiple production module installation locations which are modularly populatable with production modules. A production module installation location may be configured for the modular exchangeable positioning and setting-up of a production module in a production line with production modules arranged sequentially one behind the other along the production line. By means of the proposed production module installation locations, it is, in particular, possible to achieve advantages with regard to the flexibility of production.

In embodiments, the production module may furthermore comprise a control interface which is configured, in terms of control technology, for exchangeably detachable coupling to a corresponding complementary control interface of the production system. The control interface and the complementary control interface may be configured for the exchange of control and/or process signals and possibly corresponding electronic (measurement and/or control) data relating to the operation of the deposit system and/or the execution of a production operation by a production unit of the production module. Corresponding interfaces permit a relatively straightforward exchange of a production module, which offers advantages in particular with regard to setting-up and/or maintenance of the production line or of the production system.

In embodiments, the production module may furthermore comprise a control unit for the control of the production module. The control unit may in particular be configured for the execution of production operations, for example by operation of a production unit of the production module. The production unit may for example be a tool unit for executing a subtractive (for example milling), formative (for example forming), in particular forming, or additive (for example 3D printing) production operation.

In embodiments, the control unit may be designed such that it may be operated, in an operating mode as a slave control unit, so as to implement control commands of a master controller, which, in terms of control technology, is superordinate of the production system. This permits a relatively straightforward integration of a production module into a production line in the context of a modular exchange. In particular, the production module may be operationally set up outside the production line, such that, for example, physical exchange operations for the integration into a production line may be reduced substantially to mechanical coupling to a corresponding production module installation location.

Embodiments furthermore relate to a production system comprising at least one modularly exchangeably populatable production module installation location, preferably at least two or more modularly exchangeably populatable production module installation locations. The at least one or the at least two or more production module installation locations may be designed so as to be modularly exchangeably populatable with a production module according to one of the embodiments according to the invention described herein and/or modularly exchangeably populated with a production module according to one of the embodiments according to the invention described herein. For such a production system, advantages arise in particular with regard to the thus achievable flexibility of production, along with advantages with regard to setting-up, operation, maintenance and/or start-up.

In embodiments, the production system may comprise at least one production module installation location which is modularly exchangeably populatable or populated with a production module for subtractive, formative and/or additive production of a workpiece. In particular, the production system may comprise at least one production module which is modularly exchangeably integrated into the production line and which is designed for carrying out a subtractive, formative and/or additive production operation on a workpiece or on a workpiece component.

In embodiments, the production system may comprise a first control unit which is configured as a master controller and which is configured in terms of control technology for communication with a second control unit, which is operable as a slave controller, of at least one of the production modules. In embodiments, the second control unit may be configured so as to be selectively operable independently of the master controller. For example, the second control unit may be configured such that it may, independently of the master controller, be configured in terms of control technology for integration into the production line. In particular, the second control unit may be configured in the form of a stand-alone controller for the production module with superordinate master controller. By means of corresponding setting-up of the production modules and of the production system in terms of control technology, it is for example possible to achieve shortened exchange times during the exchange of a production module and/or during the integration of an, in particular further or other, production module into a production line.

In embodiments of the invention, a method for manufacturing a workpiece by means of a production system according to any of the embodiments described herein may be provided, or a method for manufacturing a workpiece may be provided in which the workpiece is manufactured by means of a production line having at least one production module according to any of the embodiments according to the invention described herein.

In embodiments, a method of said type may, in particular, comprise at least one of the following steps:

transferring the workpiece or the workpiece component by means of a manipulator unit between a deposit position, which is assigned to the production line, of the deposit unit and a production position, which is positioned directly downstream of the deposit position in the production direction along the production line, in the production space of a production module; wherein the manipulator unit is assigned to the production module and is optionally controlled by a controller of the production module;

transferring the workpiece or the workpiece component between a deposit position assigned to the production line and a further deposit position, in particular outside the production line, by transfer of the deposit unit with the workpiece situated thereon or the workpiece component situated thereon between the deposit position and the further deposit position; wherein a manipulating and/or intermediate production step is optionally performed in the deposit position or in the further deposit position.

In embodiments, a corresponding method may for example comprise the following steps in succession:

providing a workpiece or a workpiece component;

transferring the workpiece or the workpiece component onto a deposit unit, which is positioned immediately upstream of a production module in a production direction along the production line, in particular onto a deposit carriage, of the deposit system;

transferring the workpiece or the workpiece component from the deposit unit into a production position in the production space of the production module;

executing a production operation by a corresponding operation of a production unit, for example of a production tool, of the production module;

after execution of the production operation, transferring the workpiece from the production position to a further deposit unit positioned immediately downstream of the production module, in particular the production position, in the production direction along the production line;

transferring the workpiece from the further deposit unit into a further production position in a further production space of a further production module positioned immediately downstream of the deposit unit in the production direction along the production line, and executing a production step assigned to the further production module by a corresponding operation of the further production module.

These may be followed by further steps in which the workpiece is transferred between deposit positions and production positions along and in the path of the production line.

In embodiments of the method, additional manipulating operations and/or intermediate production steps, such as for example marking, may be performed in or in conjunction with the deposit position on the deposit unit. In this way, it is, in particular, possible to achieve improved flexibility of production.

Manipulating operations may for example comprise a translational and/or rotational movement of the workpiece or of the workpiece component.

Additional intermediate production steps may for example comprise operations such as marking, quality control etc. The additional intermediate production steps may be executed in the region of the production line, in particular within the production channel. Alternatively, individual additional intermediate production steps may also be executed outside the production line, in particular outside the production channel.

In embodiments, the method may in particular be configured such that a workpiece is transferred out by a corresponding operation of the deposit system, for example a movement of the one or more displacement carriages laterally outward or inward transversely with respect to the production line. Furthermore, in embodiments, a workpiece component, for example to be connected to the workpiece, may be transferred into the production line by corresponding operation of the deposit system.

Correspondingly, in embodiments, the method may comprise at least one of the following further steps:

providing a workpiece component which is to be connected to a workpiece in a production step;

transferring the workpiece component into the production line, in particular by transferring a displacement carriage bearing the workpiece component toward the production line, such that the workpiece component may be transferred from the displacement carriage into the production space by means of a manipulator device, for example of an adjacent production module;

transferring the workpiece component into the production space;

performing a production step in which a workpiece which is situated in the production space or which has been transferred into the production space together with the workpiece component is connected to the workpiece component; and transferring the workpiece including the workpiece component to a deposit unit positioned immediately downstream of the production space in the production direction along the production line.

In embodiments, the deposit unit, in particular the displacement carriage, may be moved or operated before, upon, in particular during, or after a production process of a production module positioned upstream and/or downstream. In the case of multiple deposit units, in particular displacement carriages, these may for example be operated synchronously. For example, it is possible for a first deposit unit to transfer a workpiece or a workpiece component into the production line while an associated second deposit unit transfers a workpiece out of the production line. The transferring in and transferring out may, as viewed in the production direction along the production line, occur from one side or from opposite sides.

In embodiments, multiple, in particular different, production modules may be provided, wherein at least two production modules, preferably multiple production modules, in particular all production modules, which are designed for actively performing a production operation in subtractive, formative and/or additive fashion, respectively comprise an associated deposit system. The deposit systems may be arranged such that respectively at least one, in particular exactly one, deposit system, in particular one deposit unit, is present between immediately adjacent production modules, for example in the case of a group of production modules, in the production direction along the production line. Furthermore, the deposit systems may be designed to be operable at least such that workpieces, as they pass through the production line or the group of production modules, are respectively stored on a deposit unit between immediately successive production spaces. In other words, a transfer from one production space to an immediately subsequent production space may comprise a deposit on a deposit unit. The transfer to and from the deposit unit from and into the respective production space may be performed through a corresponding operation of a manipulator device of the production module. A corresponding manipulator device may for example be formed so as to be integrated with the production module. In this way, it is for example possible for the manipulator device to be set up in terms of control technology outside the production line, which may in particular give rise to advantages with regard to exchange/replacement of production modules.

Here, the workpiece is not only to be understood to mean the end product that is present at the end of the production line; rather, herein, the expression "workpiece" is in particular also used for the starting or raw material and all intermediate stages.

In embodiments, a computer program product is provided, comprising commands which are executable by a processor or computing unit configured for controlling a production plant according to any of the embodiments according to the invention described herein, wherein the execution of the commands by the processor or computing unit in the production plant implements a method according to any of the embodiments described herein, in particular the execution of method steps described herein.

In one embodiment, a controller is provided which comprises means, in particular a processor or computing unit, which are/is configured for controlling a production plant according to any of the embodiments described herein for executing a method according to any of the method-related embodiments described herein.

The production module may be a forming module, in particular a press module, for the processing of workpieces. Here, the processing may comprise processing operations such as forming, in particular cold working, warm working and hot working, extrusion, punching, cutting, joining, connecting, calibrating, forging, deep drawing, pressing, etc., in particular any combinations of these. The press module may be configured for the processing of workpieces composed of metal, for example sheet metal, or of workpieces which are composed at least partially of metal, and of workpieces which are composed of or combined from multiple identical or different materials.

The press module may be designed and configured for modular integration into a press line with at least one production module installation location that is modularly exchangeably populatable with a press module, and for example with multiple processing stations.

The production line, for example press line, may comprise multiple individual, and in particular at least partially nested-together, production modules, for example press modules, in particular forming modules, or production module groups, in the case of which individual, in particular separately controllable, production modules, for example press modules, may be coupled together for example by means of transport units (or: transfer units, manipulator units) for the transport (or: transfer, manipulation) of workpieces between the processing stations or press modules or production modules. A production module group of a production line may for example comprise several of the production modules with deposit system as proposed herein. At this juncture, it is pointed out that, in the context of the invention, a production module group may likewise be understood to mean a type of production line. In particular, multiple production lines, or production module groups, may be combined to form a production plant.

Modularly exchangeably populated production module installation locations, for example press module installation locations, may in particular be configured such that individual production modules, for example press modules, in particular each production module, for example press module of a press line, may be integrated in a non-destructively exchangeable or non-destructively changeable manner at a corresponding production module installation location, for example press module installation location, into the production line, for example press line, in particular a production network, for example press network, composed of multiple production modules, for example press modules, arranged in series. Non-destructively exchangeable or changeable is to be understood in particular to mean that a corresponding production module, for example press module, may be removed from a production network (or: the production line), for example press network, and in particular inserted again, as a whole, in particular as a functional unit, that is to say while maintaining the basic functionality.

Each production module, for example each press module within the press line, may, in accordance with a respective configuration, be assigned a fixedly predefined production or processing operation, in particular forming operation, for example by virtue of the production module, for example press module, being equipped with corresponding tools.

The production module, for example press module, may, in particular, comprise a peripherally closed frame. If the production module is in the form of a forming module, in particular in the form of a press module, this may comprise at least one plunger which is mounted on the frame so as to be movable, in particular movable in reciprocating fashion, and which is designed for the processing of workpieces. Furthermore drive, in particular a pneumatically, electrically and/or hydraulically operable drive, may be provided which, at one side, may for example be coupled in terms of drive technology to the production tool, in particular the plunger, and which, at the other side, may be fastened to the frame.

A drive is, in particular, to be understood to mean a structural unit which is fastened for example to the press frame and by means of which production operations, for example including the operation of the plunger or of a processing tool for the execution of working movements, may be performed by means of a conversion of for example fluidic, hydraulic, electrical and/or pneumatic energy into mechanical energy.

In embodiments, a press module may furthermore comprise a working space which is assigned to the press plunger, formed within the press frame and configured for the processing of workpieces.

A production space is, in particular, to be understood to mean that volume in which a production module performs or may perform a production operation assigned to the production module. The production space may for example be delimited, in particular enclosed, by a frame of the production module. A production module is to be understood in particular to mean a separately operable/controllable unit which is configured for performing a predefined production operation on a workpiece within a production line.

A press module may furthermore comprise a press table which is arranged opposite the press plunger in relation to the working space or at a predefined angle with respect to the press plunger, and/or at least one further press plunger which is arranged opposite the press plunger or at a predefined angle with respect to the press plunger, or a die cushion.

In embodiments, it is for example possible for the press module to furthermore comprise a manipulator device (or: transport device) for workpieces. The manipulator device may comprise the further manipulator unit with at least one first manipulator for workpieces. The further manipulator unit may in particular be designed such that workpieces may be moved or transported into and out of the production space, for example working space, in the working cycle of the production module, for example press module. In particular, the further manipulator unit may be configured to move workpieces into and out of the production space, in particular in the workpiece flow direction or workpiece transport direction in the production direction along the production line, for example a press module or a press line.

In embodiments, the further manipulator unit (also: first manipulator unit) may be arranged at least partially in at least one recess which is provided on a frame of the production module, for example in or on the press frame, and fastened to, for example flange-mounted onto, the frame.

The recess may be formed so as to adjoin, in particular directly adjoin, the production space, for example working space, and preferably communicate with the production space. In the case of a forming module, the recess may extend laterally outward transversely with respect to the movement axis of the plunger, in particular transversely with respect to the feed direction or transversely with respect to the workpiece transport direction defined for the production space or working space. By means of a corresponding recess, sufficient free space for mounting and for the execution of working movements may be realized for the further manipulator device, in particular the manipulator.

In accordance with embodiments, the proposed production module, in particular press module, may be operated or configured in a first operating mode as an independent functional unit or processing unit for the processing of workpieces, and may be operated or configured in a second operating mode as a modularly integrated functional unit of a production line, in particular press line, with multiple modularly populatable production module installation locations, press module installation locations, and processing stations.

As an independent functional unit, in the first operating mode, a respective production module may be configured for example for workpiece processing with integrated workpiece transport, such that the production module may in particular be operated with dedicated control on its own, be it for workpiece processing or for operation as a so-called test or try-out production module, for example for the setup or run-in of a production tool etc.

The production module may, in the second operating mode, be designed as an independent functional unit such that it may as a whole, that is to say as a module or functionally ready-for-use unit, be inserted into or removed from a corresponding production position, for example working position, or a corresponding production module installation location within the production line. A removal or an exchange of a production module may be performed for example in conjunction with servicing or repair work, wherein a production module which is to be serviced or repaired may be removed and replaced with a substitute production module of identical construction. It is furthermore possible for a production module which is integrated in modularly exchangeable fashion into the production line to be removed from the production line and replaced with another processing unit or processing cell, for example a production module of identical construction. A processing unit for modular exchange for a production module may for example be configured for processing operations, such as for example joining, adhesive bonding, testing, welding, marking, laser processing, 3D printing etc.

With regard to the transport of workpieces, the further manipulator unit may for example be designed such that, within the production line, workpieces may be transported for example from a further production module which is situated upstream in the workpiece flow (in opposite direction to the production direction along the production line), or in the direction of a further production module which is situated downstream in the workpiece flow (in the production direction along the production line).

In embodiments, the production line may comprise multiple production modules designed in accordance with an embodiment proposed herein, wherein all, or at least a group of, production modules, for example forming or press modules, are at least partially or substantially entirely of identical construction. In this way, it is possible to achieve advantages with regard to servicing, substitute part stocking, provision of substitute press modules, exchangeability and the like.

For example, it is possible for several, for example at least two, of the production modules, for example press modules, or even all production modules, to be of identical construction for example with regard to the frame and/or with regard to further components such as for example plunger, drive, production tools etc., such that the production modules, for example forming or press modules, may be used or inserted at any working position within the production line, in particular forming or press line. Press modules may differ within a press line by the respectively used tool and/or by the respectively used drive, and may, in particular, otherwise be of substantially identical form and construction, for example with regard to size, dimensions, control, mechanical and electrical or electronic installation interfaces, etc.

By means of a modularized construction as proposed herein, it may be achieved that a production line may be constructed, set up and/or converted in a relatively simple manner. For example, it is relatively straightforward to change the type of processing and/or processing sequence for workpieces. Furthermore, it is easily possible to convert a production line for a different workpiece or product to be produced.

For example, for servicing purposes and/or repair purposes, a respective modularly exchangeably integrated production module may be removed from, for example moved laterally out of, the production line and repaired/serviced on site, with improved accessibility to the components of the production module. Alternatively, owing to the modular construction, it is possible for a functional substitute production module to be inserted, or pushed in, such that the production line may continue operating, and the removed production module may be repaired/serviced outside the production network or outside the production line.

After insertion of a substitute or replacement production module, the production line may be set in operation again, such that, by means of the exchangeably modular construction proposed herein of the production line, the downtimes may be minimized, and the overall plant throughput may be improved.

In embodiments, the at least one recess in which the further manipulator unit or the first manipulator is at least partially arranged or operable may have a C-shaped form in a plan view of the wide side of the production module, in particular forming or press module, which C-shaped form is open towards the production or working space. In particular, the recess may be delimited by the frame, in particular press frame, at three peripheral sides, and thereby formed so as to be open towards the production or working space.

Preferably, the recess is formed so as to communicate with the production or working space, which gives rise in particular to advantages with regard to the available movement space for the further manipulator device and, correspondingly, of the workpieces.

In embodiments, the at least one recess may be formed as an aperture which extends through the frame in the direction perpendicular to the wide side of the production module. Preferably, each of the recesses is formed by such an aperture.

Correspondingly formed recesses make it possible to construct a relatively stable, closed frame which offers sufficient space for receiving manipulators, such as for example grippers and associated transport devices, such as for example linear guides, rotary guides, robot arms and the like.

In embodiments, laterally to both sides of the working space a respective one of the recesses may be formed. The recesses may for example be formed so as to be symmetrical in relation to the axis of the production module. A corresponding further manipulator unit, in particular a first manipulator, may be arranged in each of the recesses, such that a workpiece situated in the working space may be gripped at laterally opposite sides and transported for example in the direction of the workpiece flow, that is to say in the workpiece flow direction.

In particular, the further manipulator unit may be designed such that a workpiece may be transferred from the deposit position into the respective production or processing position situated in the working space, for example onto a corresponding lower tool, and, after processing, for example forming etc., transferred from the production or processing position, for example from the tool, to a deposit position for example of a downstream production module or of a downstream production or working position, processing station or processing cell.

In embodiments, a further manipulator unit (also: first manipulator) may be present in each of the recesses, wherein the further manipulator units may each be fastened to the frame. An advantage of the further manipulator devices integrated in the production module may be seen in particular in the fact that these may already be operationally set up before being integrated into the production line, such that substantially no additional (installation) effort for setup and synchronization is required in the event of an exchange or change.

In embodiments, the further manipulator unit may for example comprise at least one mechanically, pneumatically, magnetically and/or adhesively operating gripping member designed for gripping a workpiece. The gripping member may be coupled to one or more actuator units (or: drive units), wherein the at least one actuator unit permits a movement of the gripping member in at least two or at least three different movement directions or spatial directions.

The at least one actuator unit may for example comprise one or more linear actuator units which permit a movement of the gripping member in three, in particular mutually perpendicular, spatial directions. Aside from this, use may also be made of actuators which permit a rotational or combined rotation-linear movement of a workpiece.

For example, the following may be considered as movement directions (or: movement degrees of freedom) for the gripping member: parallel to the feed direction, parallel to the working axis of the respective production module, for example parallel to the movement direction of the plunger of a forming module, and perpendicular to the working axis of the respective production module, or feed direction, in particular such that a raising or lowering and onward transfer of a workpiece is possible.

Embodiments of the invention furthermore relate to a press module according to the discussion below, wherein the press module of the embodiments described further above may be configured correspondingly to the discussion below.

The press module is, like the press module already described, provided for the processing of workpieces. Here, as already mentioned, the processing may comprise processing operations such as forming, in particular cold working, warm working and hot working, extrusion, punching, cutting, joining, connecting, calibrating, etc., in particular any combinations of these. The press module may be configured for the processing of workpieces composed of metal, for example sheet metal, or of workpieces which are composed at least partially of metal, and of workpieces which are composed of or combined from multiple identical or different materials.

The press module is configured for modular integration into a press line with multiple processing stations, wherein each processing station may comprise in each case one separate press module. In particular, the press module may be configured for modular integration or installation at a press module installation location of a press line which is modularly exchangeably populatable with press modules.

The press module may in particular comprise a peripherally closed press frame, and a press plunger which is mounted on the press frame so as to be movable, in particular movable in a reciprocating fashion, and which is designed for the processing of workpieces.

The press module may furthermore comprise a drive which, at one side, is coupled in terms of drive technology to the press plunger and which, at the other side, is fastened to the press frame. The drive may comprise a pneumatic, electrical and/or hydraulic drive unit, in particular any combination of the stated drive concepts, by means of which pneumatic, electrical and/or hydraulic energy may be converted into mechanical kinetic energy for the movement of the plunger.

The press module furthermore comprises a working space which is assigned to the press plunger and which is formed within the press frame and which is set up for the processing of workpieces. Furthermore, the press module may comprise a press table which is arranged opposite the press plunger in relation to the working space or at a predefined angle with respect to said press plunger, a further press plunger, or a die cushion.

The press module furthermore comprises a or the manipulator device (or: transport device) for workpieces, having a second manipulator unit designed in the form of the manipulator unit and having at least one second manipulator (in particular: displacement carriage) which is, situated transversely, in particular perpendicularly, with respect to the feed direction or transversely, in particular perpendicularly, with respect to the discharge direction of the press module or of the working space, arranged at a wide side of the press frame, in particular fastened to the press frame, and which is positioned upstream or downstream of the working space.

In embodiments, the manipulator unit (also: second manipulator unit) may for example be configured so as to support or define the path of the workpieces in that region of the production channel of a production line which is positioned upstream or downstream of the production or working space. For example, the manipulator unit may be operated in a synchronous manner with the one or more further manipulator units, such that workpiece transport between the production or working spaces of two immediately successive production modules is possible. In particular, the manipulator unit may be formed or operated or used as a type of intermediate depository, such that, at the intermediate depository, it is for example possible for workpieces to be deposited between two processing stations, in particular in the context of cyclic transport of the workpieces along the production or processing line, for example before the workpieces are fed to a downstream production or processing station.

In embodiments, the at least one second manipulator may comprise at least one workpiece depository which is positioned upstream or downstream of the working space in the processing direction and which is preferably attached in a stationary manner to the wide side. The workpiece depository may for example be arranged and configured such that, in a press line, a workpiece may be placed onto the workpiece depository from the working space by means of a first manipulator of a press module. From the depository, the workpiece may be gripped and moved onward in the working cycle of the press line, for example by means of a manipulator of a downstream processing stage, in particular a first manipulator of a downstream press module. In particular, a workpiece may be transferred from the depository into the working space of a downstream press module.

By means of temporarily depositing a workpiece, and a corresponding operation, in particular of the first manipulators, it is possible, in the context of the modular construction proposed herein, to implement a cyclic operation for the transport of workpieces along the production or processing line. Even in the case of an exchange of a production module, it is possible, with the use of the proposed intermediate depository, to implement a corresponding cyclic transport of workpieces again in a simple manner, in particular if the manipulator unit is installed on the production module, for example on the frame, and forms a ready-for-use unit with the production module for use in a production line. Furthermore, it is possible to achieve simplifications with regard to construction and function of the further manipulator device.

In embodiments, the at least one displacement carriage (also: second manipulator) may be attached so as to be displaceable parallel to the wide side and transversely with respect to the feed direction, and may be positioned upstream or downstream of the production or working space in the production or processing direction along the production line. With the displacement carriage, it is possible for a workpiece to be moved laterally outward away from the production space (also: working space) or inward toward the production space. In embodiments, it is possible that exactly two displacement carriages are provided. In further embodiments, a manipulator unit may be provided, in particular fastened to the frame, at only one wide side, or one manipulator unit may respectively be provided, in particular fastened to the frame, at both opposite wide sides. The manipulator units may be situated and mounted at least partially above or below the production or working space. The displacement carriage and the associated components may for example be fastened to the press frame, such that, in the event of exchange of a press module of a press line, it is also possible for corresponding manipulator units, manipulators etc. to be concomitantly exchanged.

The displacement carriage may for example be configured such that workpieces, in particular workpiece stages, may for example be removed from the production line during operation, for example for testing purposes and the like. For example, by means of the laterally displaceable displacement carriages, it is possible for corresponding workpiece stages to be transferred out laterally from the production line.

For this purpose, it is for example possible for the further manipulator unit to place a workpiece onto a displacement carriage, and the displacement carriage may thereupon transport the workpiece laterally outward, for example for the purposes of removal. At the same time, a further displacement carriage may be moved into the region of the working space for depositing purposes, such that the cyclic operation of the production line, in particular press line, may be continued.

It is furthermore possible for (additional) parts or components required for the workpiece production or processing, such as for example threaded elements or other elements for producing composite components from multiple different materials, to be fed to the production or working space by means of a corresponding displacement carriage. In particular, corresponding components may be transferred laterally into the production or processing line.

In embodiments, the at least one second manipulator may comprise at least two displacement carriages which, by means of a displacement unit, in particular a linear displacement unit, are respectively positionable, in particular in synchronized fashion, at a first position situated at the working space and at a second position laterally averted from the working space, in particular a second position situated laterally at least partially outside the press frame.

Through the provision of two, in particular synchronously or asynchronously moveable, displacement carriages, it is possible, as already indicated, for any additional components to be fed or workpieces or workpiece stages to be removed, without the need for a changed cycle time of the press modules within a press line.

In embodiments, one of the displacement carriages may be positioned as a depository at the production or working space while the second displacement carriage is positioned laterally at the outside, for example in order to transfer out a workpiece, or in order to be populated there with additional components for example.

In embodiments, the deposit unit or the first or second displacement carriage may be linked to one or more additional process functions or intermediate production stages, such as for example: rotating the workpiece, marking the workpiece, and others. In particular, on the basis of the manipulator unit, it is possible for additional intermediate production steps to be integrated, for example between two forming operations of two successive press modules in, for example, a press line.

In embodiments, the frame of a production module, in particular press module, may have, laterally at the side, that is to say at a lateral side transversely with respect to the feed direction, at the level of the production or working space at least one lateral aperture which communicates with the production or working space, wherein the at least one lateral aperture together with the working space form a channel which extends in a lateral direction, that is to say transversely with respect to the feed direction/working axis, and which is designed such that a tool which is situated in the production or working space, and which may for example be coupled to a press plunger, a press table or to a counterpart plunger, may be removed, inserted, changed and/or exchanged in a lateral direction, in particular transversely with respect to the feed direction.

In embodiments, the frame may have two lateral apertures which are formed on opposite lateral sides of the press frame and which, respectively, communicate with the working space. The two lateral apertures may be in alignment with one another and formed such that a tool may be removed or inserted from a lateral side, and such that another tool may be inserted or removed from the opposite lateral side.

In embodiments, the two lateral apertures may have substantially the same cross section in a lateral plan view, in particular viewed in planes parallel to the feed direction and movement direction of the press plunger. By means of the one or more apertures, a tool change may be performed in a relatively simple manner, wherein it is alternatively also possible for a tool change to be performed by exchanging an entire or complete production module, for example a complete press module, which is possible relatively easily owing to the exchangeably modular construction proposed herein.

In embodiments, at least one of the at least one lateral apertures may be assigned a transfer unit which is preferably fastened laterally at the side to the frame, in particular press frame, and which is configured to support or implement a, for example manual, semi-automatic or automatic tool change. For example, the transfer unit for supporting a tool change may be formed on a press plunger and/or press table. In embodiments, the transfer unit may comprise a conveying unit formed, in particular, in the manner of a roller conveyor and which projects laterally from the frame, in particular approximately horizontally, and by means of which a tool may be moved toward or away from the working space for example.

In embodiments, the press frame may, at least at a wide side, in particular at a side of the press frame which is perpendicular to the (tool) feed direction, be formed so as to be open in that range of movement of the press plunger that adjoins the working space. Preferably, the press frame is open on both sides, that is to say the press frame is, in the range of movement of the press plunger, open all the way through and has for example an aperture extending through the press frame. Based on the described open form of the wide side or by means of the apertures, it is possible to achieve improved accessibility to the press plunger and furthermore to the working space and/or to the tools and other components installed in the region of the working space, such as for example manipulators, manipulator units and the like.

In embodiments, the press module may furthermore comprise a mechanical connecting unit (or: interface), wherein the connecting unit is configured for the exchangeably mechanical coupling of the modularly exchangeable press module to an, in particular predefined, platform (or: a pedestal or a counterpart interface) assigned to or comprised by a press line, wherein the platform comprises or defines multiple press module installation locations which are modularly populatable with press modules, wherein the press module installation locations are designed for the, in particular modular, exchangeable positioning and setting-up of press modules in the press line, in particular in a press module network.

Based on a correspondingly set-up platform, a press module may relatively easily be integrated into the press line and/or changed, for example, for servicing or repair purposes. The downtime of the press line may be minimized, and the workpiece throughput may be optimized.

In embodiments, a connecting unit, in particular sliding interface, or the platform may be provided, designed and configured so as to enable a production module to be pushed in or exchanged at a modularly populatable production module installation location, or, in more general terms, at a modularly populatable production or processing installation location in a production line, for example in a press line. The connecting unit/platform may be configured for changing the sequence of successive production modules and/or production or processing stations, for example by exchange of two or more production modules, and/or by changing of the spacing of two successive production modules and/or production or processing stations of the production line.

In embodiments, the control interface and corresponding complementary control interface may be configured for the transmission of electrical energy to the production module and/or for the transmission and/or exchange of operating parameters or control parameters.

With corresponding interfaces, the exchange/change of a production module in a production line, in particular the removal and the insertion of a production module, and for example the incorporation of a production module in terms of control technology into a production line or the separation of a production module in terms of control technology from the production line may be simplified.

Operating parameters and/or control parameters for the control of the production module may be exchanged for example via a data connection with a superordinate control computer and/or local or remote data memory, in particular in unidirectional or bidirectional fashion.

Operating and process parameters acquired at the production module, such as for example forming pressures, press and process values, may be subjected to data processing or used at the respective production module, and/or transmitted to a superordinate computing unit, controller, in particular a computing unit connected to the production module via a data transmission connection, for example for manipulating, data processing and evaluation purposes.

Owing to the modular construction of the production line, in particular press line, proposed herein, having multiple individual production modules, in particular press modules, at corresponding modularly populatable production module installation locations, in particular press module installation locations, or processing units at corresponding modularly populatable processing installation locations, it is, in particular, possible for operating and production parameters for individual workpiece stages at the respective production modules, in particular press modules or processing units, to be separately determined and/or separately set or configured.

In particular, with the production modules proposed herein, which, in embodiments, comprise only one production or processing stage, it is possible for process parameters to be individually detected and/or set for individual production or processing stages, whereby the proposed modular configuration with individual production modules differs from conventional production lines, for example large transfer presses, where multiple processing stages are performed by means of forcedly coupled movement sequences in a unitary production space. In the case of large transfer presses or multi-stage presses, it is for example not possible for press and process parameters to be detected separately for individual press processing stages. In this respect, the proposed modular construction offers advantages in particular with regard to process and quality control. By contrast to large transfer presses of said type, the production steps of the production line proposed herein may be performed in a substantially decoupled manner in the context of cycle time, such that process and quality control is made possible for individual production steps and operations.

Aside from this, conventional large transfer presses or multi-stage presses, by contrast to the modular construction proposed herein, for example require relatively heavy and massive plungers. With the modular construction proposed herein, it is, in particular, possible, in conjunction with press modules, and in relation to conventional large transfer presses or multi-stage presses, for the moved mass required per processing stage for carrying out multiple processing steps to be reduced, which may result in energy savings.

Furthermore, with the modular construction, it is possible inter alia to achieve advantages with regard to the accuracy or fineness of the control of the production steps, for example of the plungers. For example, it may be possible for multiple relatively small plungers of individual processing stages to be controlled more easily and accurately than one large plunger which encompasses all processing stages.

In embodiments, a press line may be provided which has multiple, but at least two, press modules which are arranged along a processing line. The press modules may, respectively, be designed according to one of the embodiments corresponding to a production module of the invention as described herein. In particular, the press modules may have the manipulator device and/or may be exchangeably coupled to a corresponding platform with multiple modularly exchangeably populatable press module installation locations.

The modularization proposed herein, in particular, relates to the mechanical incorporation or integration of a production module and the integration in terms of control technology of a modularly exchangeable production module.

In particular, by means of the modularization, it is possible to reduce downtimes of the production line arising from repair or servicing work, because, for example, it is possible for a defective production module to be removed and easily exchanged for a functional substitute production module. A repair of the defective production module may be performed for example outside the production line, during times in which the production line is operated with the substitute production module. Advantageous operating times and workpiece throughputs are consequently achieved.

However, it is not only an exchange for servicing, repair or cleaning purposes that is possible. The proposed modular construction and the modularization proposed herein furthermore make it possible for processing locations of the production line to be populated in a variable manner.

Furthermore, the proposed modularization permits relatively straightforward setup of production modules in terms of control technology, be it in the case of use as an individual production module or in the case of use in a production network within a production line of modular construction.

In embodiments, the production line may comprise multiple, but at least two, mounting pedestals which are designed for exchangeably receiving a production module, wherein a respective production module may comprise a mounting interface designed for mechanical coupling to the mounting pedestal. The mounting pedestals may for example be provided by a platform as already described further above, comprising for example a rail system. By means of a suitable combination of interfaces, an exchange or replacement of a production module may be performed in a relatively short time and with relatively little effort.

In embodiments, the mounting pedestal and the mounting interface may comprise mutually corresponding coupling elements by means of which a respective production module may be (non-destructively) exchangeably integrated into the production or processing line. For example, a guide system, in particular a rail-roller system, may be provided which permits a displacement of individual production modules. Furthermore, for the fixing of the production modules to respective production module installation locations and/or to the production modules, corresponding (quick-action) mounting elements or interfaces may be provided. In this respect, a production module may be integrated by being moved as a whole, that is to say as a single functional unit, by means of the platform, or the guide system/rail-roller system, to the respective production module installation location and subsequently being fixed by means of the mounting elements. Conversely, a production module may be removed by virtue of the mounting elements being released, and the press module being removed, in particular as a whole, that is to say as a single functional unit, by means of the guide system/rail-roller system.

As already mentioned, a platform of the production line may have first guide elements, for example rails, and the production modules may have corresponding second guide elements, for example rollers. Other guide elements and guide units, in particular sliding guides, roller guides, etc., are conceivable.

A mounting pedestal corresponding to a production module installation location may be designed for example as a tray-like insert or comprise such an insert, wherein the insert may be designed such that a production module may be removed from the production line in a direction perpendicular, in particular laterally, with respect to the processing line. A corresponding guide system may for example comprise guides, for example rails, which run transversely or laterally, in particular perpendicularly, with respect to the production line or processing line.

In embodiments, the insert may comprise a (forced) guide system, in particular linear guide system, preferably a rail system, by means of which in each case one of the production modules, in particular press modules, is couplable and displaceable perpendicularly with respect to the production line, in particular processing line. The guide system may be configured such that a respective production module may be removed, inserted and/or exchanged perpendicularly with respect to the production line.

Furthermore, the guide system may be configured such that a respective production module is positionable such that its production space is situated in alignment with the production channel, or such that its production space is situated outside the production line.

With corresponding guide systems, the effort required for the exchange of a production module may be considerably reduced. Furthermore, individual production modules may be pulled out of the production network for example laterally, whereby, if required, the accessibility to the components of the respective production module, for example in the case of brief servicing or cleaning work, may be improved.

In embodiments, the production module installation location of the one or more production modules may be fixedly predefined on an underlying surface, or the production module installation location may be formed on an underlying surface so as to be variable in terms of position in one or two dimensions, in particular along and/or transversely with respect to the production line.

In embodiments, the production line or the production system may furthermore comprise a control interface which is coupled via a wired or wireless data communication means, in particular a control bus, to a production line controller. The control interface may be configured for, in particular wired or wireless, coupling in terms of signal technology and control technology to a complementary interface of an exchangeable production module, and furthermore for, in particular, unidirectional or bidirectional transmission of control commands and/or operating parameters of the production module.

In embodiments, at least one of the exchangeable production modules may comprise a production module controller by means of which the operation of the components of the production module is at least partially, preferably completely, controllable. With a corresponding controller, a respective production module may be used in a flexible manner, and may be operated and used in the network within a production line, on its own as an individual production module, or in different production lines.

In embodiments, the production line may furthermore comprise a monitoring unit for receiving, for acquiring and for data processing of operating parameters, in particular production and process parameters, of the individual, in particular exchangeable production modules. In particular, in this way, the operation of the production modules, in particular individual production steps, may be monitored and documented as required.

Synchronous, in particular synchronously cyclic, operation of the production modules in a production line may be controlled for example by means of a superordinate master controller, which is connected in terms of control technology to the production modules situated at the respective production module installation locations, in particular to the controllers thereof.

In embodiments, the production line may furthermore comprise at least one buffer unit (in particular: workpiece buffer unit), which is integrable in particular in modular fashion into the production line. The buffer unit may be designed for receiving and temporarily storing (or: temporarily buffering) workpieces, in particular partially processed workpieces.

The buffer unit may, in embodiments, be couplable or coupled to a manipulator or transfer unit of an upstream production module for the feed of workpieces, and to a further manipulator unit or transfer unit of a downstream production module for the removal of temporarily buffered workpieces.

The buffer unit may for example be configured such that workpieces may be temporarily stored therein, for example in order to be able to bridge the change or the re-equipping of the production line with starting material such as a sheet-metal coil in the case of a press line and/or the exchange of a production module.

In embodiments, a production module as described herein further above or below, in particular a forming module or press module, may be configured for being integrated in an exchangeable, in particular modularly exchangeable, manner into a production line described herein with modularly populatable production module installation locations, wherein the expression "exchangeable" is intended to encompass, in particular, a (non-destructive) quick change and/or exchange of one of the production modules without long-term impairment of the operation of the production line.

In embodiments, a method for setting up a production line, for example forming line or press line, which is modularly populatable with production modules, in particular forming modules or press modules, is provided, wherein the production line may be configured in accordance with an embodiment described herein, and wherein the production line is populated or populatable with at least one production module which is (modularly) exchangeable as a whole and which is, in particular, designed in accordance with one of the embodiments described herein. Preferably, a production module is set up or integrated at a production or processing position which is variably or modularly populatable with a corresponding production module, or at a corresponding production module installation location.

The proposed method may, in particular, comprise the following steps:
- an exchangeable production module is mechanically installed at the at least one modularly populatable production position or the modularly populatable production module installation location by means of mechanical coupling elements for exchangeable replacement of a production module; and
- the installed production module is connected in terms of control technology to a master controller of the production line and is integrated into the operating sequence along the production line.

In embodiments of the method, it is possible, preferably after connection of the exchangeable production module, in particular press module, in terms of control technology, for control parameters for the control of the exchangeable production module to be transmitted to the exchangeably integrated production module. The control parameters, for example press and process parameters, may for example be transmitted from a master controller of the production line, which master controller is connected via a data communication means to the production module and is designed for controlling all production modules.

In embodiments of the method, it is possible, preferably after connection of one or more, in particular all, modularly exchangeable production modules in terms of control technology, for control parameters for the control of the modularly exchangeable production module and/or for the control of the entirety of the production modules and processing units of the production line to be transmitted to a or the master controller of the production line.

In embodiments of the method, it is possible, after installation of the one or more modularly exchangeable production modules, for control parameters for the operation of the production module and/or control parameters for the operation of the production line to be transmitted from a memory integrated into a communication network at the location of the production line, or from a memory (in particular cloud memory) or computer at a location remote (or: separate) from the location of the production line via a further communication network, to the communication network of the production line, for example a control or data bus, for the purposes of the control of the production line (of modular construction).

In embodiments of the invention, a method for generating operating parameters for a production line, which is designed in particular according to an embodiment described herein and which has for example multiple modularly exchangeably populatable production module installation locations, is provided. According to the proposed method, an operating and/or control parameter dataset corresponding to a predefined operating mode, and optionally a predefined number and type of production or processing stations, and tools, is generated in a test run on an (in particular individual) test production module (in particular: try-out production module) designed according to one of the embodiments described herein for a production module, or on a test production line (in particular: try-out production line) designed according to one of the embodiments described herein for a production line.

The generated operating and/or control parameter dataset is, for the configuring, that is to say for the purposes of the operational setup in terms of control technology, of the production module/production line of substantially identical, preferably completely identical, construction to the test production module/to the test production line, transmitted to the production module/the production line via a data communication path, or is stored in a buffer memory provided for transmission to the production module/the production line.

In embodiments, the operating and/or control parameter dataset may be transmitted from the buffer memory to the production module or the production line for the purposes of operational setup.

It is preferable for all production modules, or at least one group of production modules, of a processing unit or of a production line to be of identical construction. This has the advantage that an individual production module, or a small number of production modules, are sufficient as a try-out module in order to be able to set up the production modules, of respectively identical construction, of the production line, for example in conjunction with the setup and introduction of production or processing tools.

In embodiments, a method for the operational setup of a production line designed for the production of workpieces, for example with multiple modularly exchangeably populatable production module installation locations, may be provided, wherein the production line may be designed in accordance with one of the embodiments proposed herein. The method may also or alternatively be provided for the operational setup of at least one production module designed in accordance with one of the embodiments described herein, and integrated into a production line, for example with multiple modularly exchangeably populatable production module installation locations.

The proposed method comprises the step of reading in an operating and/or control parameter dataset from a portable memory medium, a local data memory or computer connected to a data communication network, or a data memory or computer at a remote location and connected to a data communication network, for example in a cloud-based data communication environment.

In particular, with the proposed method, it is possible, in case of production modules of correspondingly identical construction of a production line, to read in operation, control and/or process parameters determined on a try-out module, such that the production line or one or more production modules of the production line are operationally set up. After reading-in of the operating and/or control parameters, the production line may be set in operation, such that the expenditure of time required at the location of the production line for the operational setup of the production line, for example for the setup or introduction of tools, as a whole or of one or more production modules of a respective production line may be considerably reduced.

In embodiments, the method may comprise a method step in which at least one production module of the production line, for example at a respective production module installation location, is inserted or exchanged, and in which operating and/or control parameters for the inserted or exchanged production module are read in at the production line from the memory medium, the local or remote data memory. The operating and/or control parameters (control parameter datasets) may be read into a control unit which is locally assigned to the respective production module and/or into a main control unit which is assigned to the production module, in particular a master control unit. In this way, it is possible for individual production modules assigned to the respective processing stations of the production line that is modularly populatable with production modules to be easily exchanged and to be operationally set up with relatively little expenditure of time after the exchange.

In embodiments, the method may furthermore comprise the further method step whereby, in addition to the operating and/or control parameters, at least one, preferably all, of the tools associated with the operating and/or control parameters are inserted into respective production modules. In particular, in this way, time-optimized conversion and setup of a production line is possible.

In embodiments, a production plant, in particular a processing center, is provided, comprising a production line which is modularly populatable with production modules and which has one or more production module installation locations and which is designed according to one of the embodiments described herein. Furthermore, according to embodiments, a production plant is provided comprising at least one production module according to one of the embodiments described herein.

The invention described herein in particular relates to a production module, and to a production line in the case of which one or more of the production modules are arranged at, in particular fixedly predefined, modularly populatable installation locations, in particular production module installation locations, such that a or the production module(s) can be removed from the network and exchanged for a substantially identical further production module in a flexible and straightforward manner.

The modularly exchangeable production modules may be designed such that, having been equipped with the respective processing tools, they can be used at any desired processing position or at any production module installation location of the production line.

One or more of the production modules in a production line may, in particular, be designed so as to be integrated detachably in a modularly exchangeable manner in the network.

A production line as proposed herein may therefore comprise two or more production or processing positions at which, for example by means of quick-change interfaces, production modules may be arranged in a detachably exchangeable manner. In the event of a defect, or for the purposes of servicing of one of the production modules, the respective production module may be removed as a whole from the network and replaced with another production module, having, for example, a similar or identical configuration. It is also possible for individual production modules to be removed and replaced with other production or processing units.

A controller of a respective production module may be configured so as to permit direct control of the production module, that is to say such that the production module is operable as an individual press. In the production network, that is to say in the case of integration of the production module into a production line with modularly populatable production module installation locations, a superordinate controller may assume control authority for the production modules in the production network and, by this, synchronize the operation of the production modules and of the associated manipulator units, for example. The controllers of the individual production modules may, during the operation in the production network, have a so-called master-slave relationship with the superordinate controller of the production line, where main control tasks and synchronized operation being specified by a master controller, and further control tasks being implemented locally at the respective production module at least partially by a slave controller.

The proposed production module may furthermore, as already described, comprise a tool change system. The tool change system may be designed such that a tool change is possible from one or from two (for example lateral) sides of the production module.

In the case of a tool change from one side, that is to say using only one lateral side, it is possible for the or a or multiple tool(s) of the production module, for example upper and/or lower tools, to be removed for example jointly from the installation space or working space of the production module, for example of a press module, and it is possible for a new tool pack, composed for example of upper and lower tool, to be introduced into the installation space or production or working space. For this purpose, use may for example be made of tool change consoles, provided on the production module. The new tool pack may be manually or automatically fixed after being inserted.

In the case of a tool change from two sides, that is to say using both lateral sides, the one or more tools, for example an upper and lower tool, may be removed jointly in a predefined direction toward one side of the press module, for example in the direction of the rear side or front side of the press module, and, at the same time or subsequently, the new tool pack may be introduced into the installation space from the opposite side (front side or rear side respectively), and for example manually or automatically fixed.

In the case of the press module proposed herein being used in a press network, it is possible for several of the press modules installed in modular fashion at corresponding press module installation locations to be operated, and controlled by means of a superordinate master controller which assumes authority over the process, wherein the master controller may be configured to synchronize the press modules and workpiece movements (or: workpiece transfers) in the press network.

In the production network, in particular within a production line, it is possible, in accordance with an embodiment of the invention proposed herein, for at least one production module, or multiple, preferably all, production modules, to be arranged so as to be displaceable, for example by means of a rail system, such that a respective production module may be removed from the production network from a production module installation location by means of the rail system and, likewise by means of the rail system, may be exchanged for example for a substitute production module. In particular, it is thus possible in the event of a fault for an individual production module, or several of the modularly integrated production modules, to be removed from the production network and for one or more substitute production modules to be inserted.

It is furthermore possible for one or more production modules to be removed from the production network, for example in order to create space in the production network, if it is sought for other production units, such as for example welding station, processing systems, bending stations, forming station, 3D printing station, etc., to be introduced for example in place of a production module modularly integrated at a production module installation location.

Aside from this, by means of the free positionability or usability of individual production modules at corresponding production module installation locations, it is possible to implement different processing sequences and production processes, wherein, in particular, the sequence, number and/or spacing of the production modules may be set in a flexible manner in accordance with respective requirements.

A production module proposed herein may furthermore be configured for acquiring process values and transmitting these to a corresponding data processing unit. In this way, it is possible for process values to be, in particular separately, acquired and stored at respective process stages, preferably at all process stages of a production network. The process values may be used locally or globally for further evaluation and production data tracking.

The production line proposed herein and the production module proposed herein permit, on the basis of the modularly populatable production module installation locations, a variable plant configuration which is in particular scalable to changing demands on workpiece production, in particular sheet-metal forming. Processing operations such as cutting, punching, bending or deep-drawing etc. may be implemented or realized by means of individual, respectively separate, production modules or processing modules, which may be used as required, such that a predefined processing sequence may be easily implemented by means of a corresponding selected composition of the processing modules.

Possible further advantages of the invention described herein are in particular that a production line with modularly exchangeably populatable production installation locations may be implemented;

in the case of a production line, a modular construction may be implemented which is scalable and substantially freely configurable;

each production module may have a dedicated controller and a dedicated drive, whereby individual control of the respective processing step is possible;

relatively small structural heights may be achieved;

a production line may be set up even without a special foundation;

it is possible, for example, to implement a forming network, in particular press network, with forming modules or press modules in which stroke rates of >50/min are possible, wherein a forming line may comprise forming modules with a "pressing force" of up to 50 t or up to 100 t;

the production modules in the production network may be variably interlinked, for example by means of master-slave control arrangements;

a removal of stages is possible during ongoing operation;

a tool change may be easily performed;

new working steps may be separately introduced, for example already during the tool construction process, by means of so-called try-out modules;

a production channel, in particular a continuous production channel, may be formed in which the workpieces may be moved, for example in cyclic fashion;

easy servicing and maintenance is possible by virtue of the fact that defective production modules and assemblies may be easily exchanged, whereby stocking of replacement parts may be simplified and downtimes as a result of defects and/or servicing may be reduced.

For the tool change, it is for example possible for hydraulic spherical-roller rails to be attached to the press frame, wherein the bearing force of the spherical-roller rail is selected in accordance with the respective tool weight.

In embodiments, a production module may be designed to be operated in three operating modes: setup, stand-alone operation, automatic. In the "setup" operating mode, it is for example possible for all movements to be performed with a reduced speed by actuation of the two-hand controls on a control panel. A respective command may in this case be provided as a continuous command, that is to say, if the operator releases a corresponding command unit, then an associated movement is stopped.

In the "stand-alone operation" operating mode, individual production steps, for example press strokes in the case of a press module, may be actuated.

In the "automatic" operating mode, all production modules in the production network operate and are synchronized by means of the superordinate controller.

A production line set up according to the invention may be operated in the following operating modes: setup, stand-alone operation; continuous running, continuous running with transfer; tool change.

In the "setup" operating mode, all production movements may be performed with a reduced speed by actuation of corresponding command units. A respective command may be provided as a continuous command, that is to say, if the corresponding command unit is released, then the associated movement is stopped.

In the "stand-alone operation" operating mode, a complete production cycle, for example press cycle, may be performed at normal speed.

In the "continuous running" operating mode, a production module may be operated fully automatically. Prior to starting of the automatic sequence, the production module may be placed into a basic setting.

In the "continuous running with transfer" operating mode, the entire production line may be operated fully automatically. Prior to starting of the automatic sequence, the plant may be placed into the basic setting. The automatic operation may be stopped again at any time, wherein, during the stoppage state, it is for example possible for setting-up movements or operations to be performed, for example by manual operation, such that, for example, relatively small disruptions, for example with regard to the material flow, may be eliminated. Subsequently, the automatic sequence may be restarted, wherein the plant may be configured such that the basic setting does not have to be assumed again for the subsequent start-up.

BRIEF DESCRIPTION OF THE DRAWINGS

Exemplary embodiments of the present invention will be described in more detail below on the basis of the following figures, in particular on the basis of a forming or press module and a forming or press line. In the Figures.

DETAILED DESCRIPTION OF THE PREFERRED EMBODIMENTS

Figure 1:
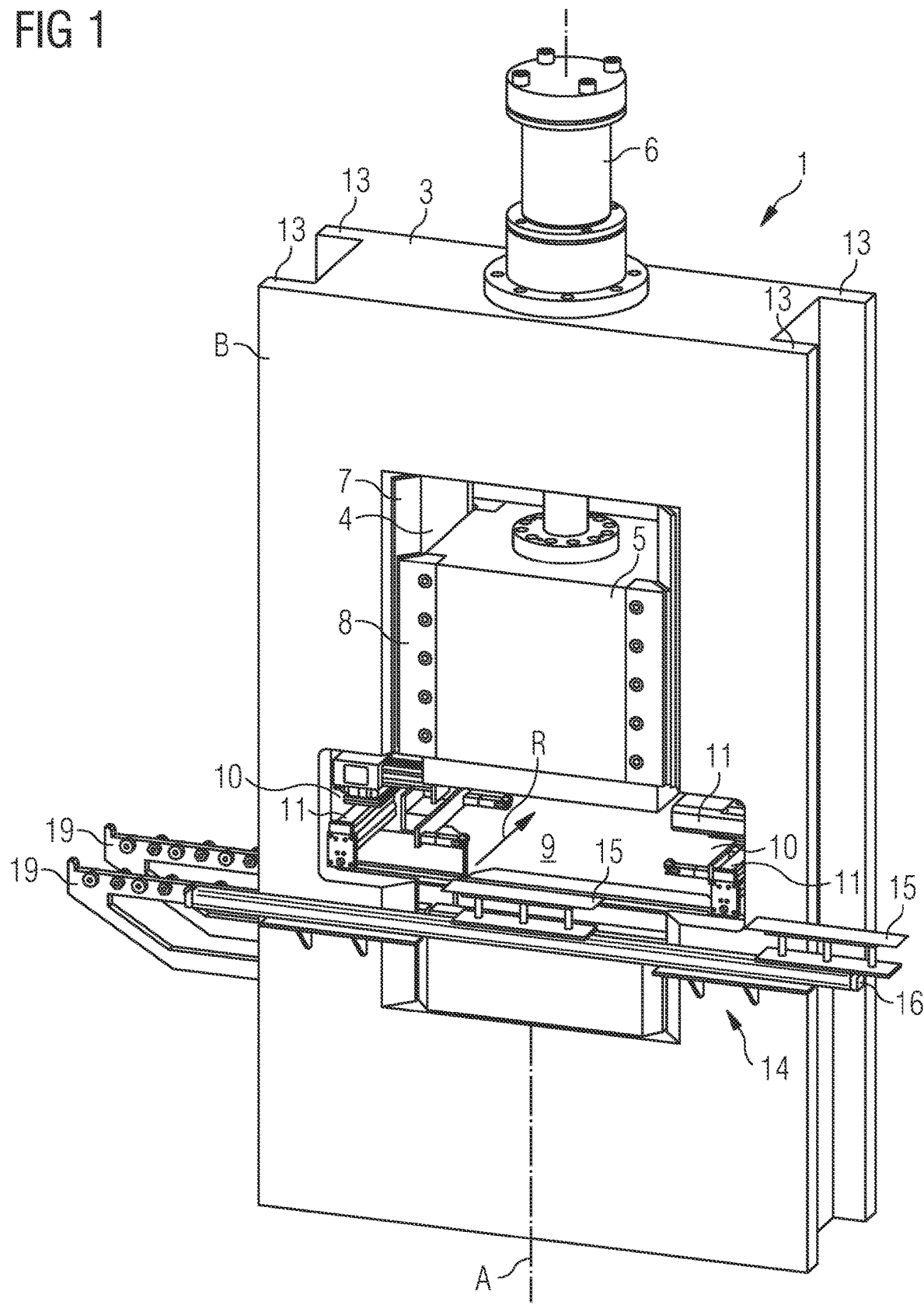
FIG. 1 shows a perspective view of a press module without inserted press tools.

FIG. 1 shows, as an example for a production module, a forming or press module 1 for the processing, in particular for the forming, of workpieces, preferably at least partially composed of metal, in particular sheet-metal. The workpiece may be produced from one or more different materials, and may for example comprise components composed of different metals and/or plastic.

Figure 9:
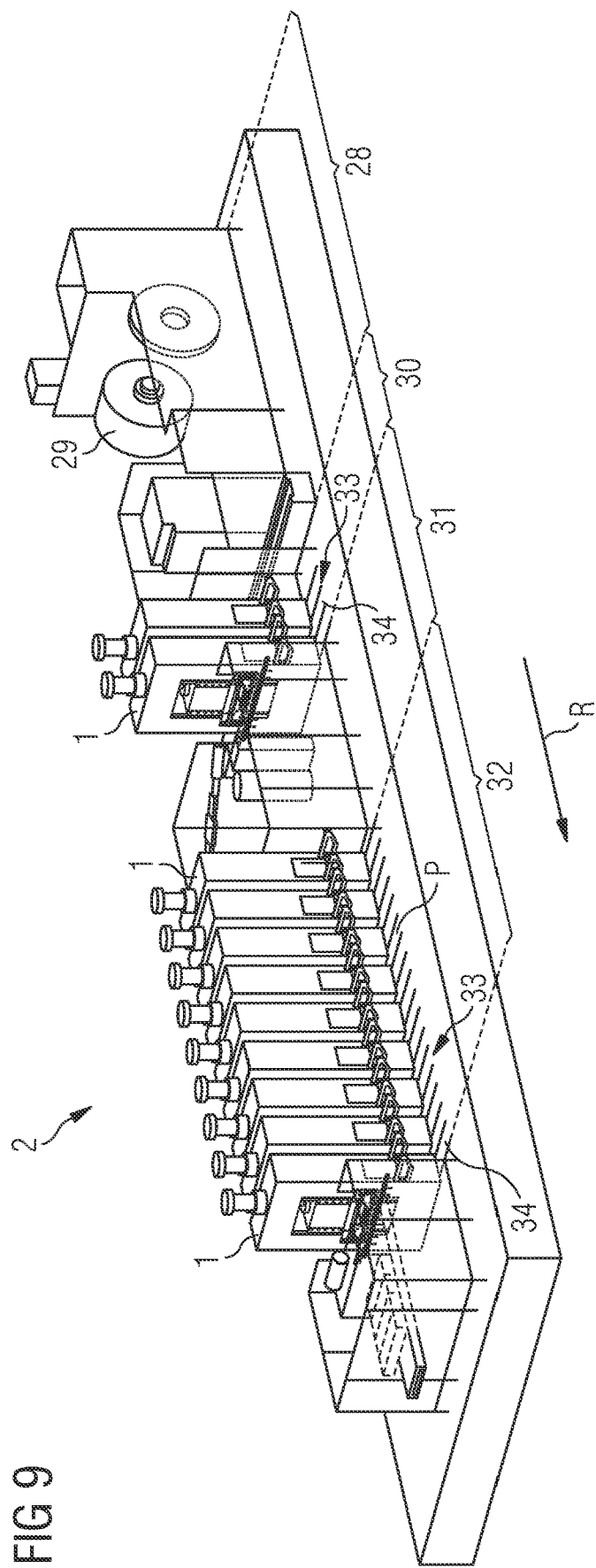
FIG. 9 shows a press line with multiple press modules.

The press module 1 is configured and designed for modular integration into a press line 2, as shown in FIG. 9, with multiple successive working positions and press module installation locations which are assigned to the working positions and which are modularly exchangeably populatable with press modules.

The press module 1 of FIG. 1 comprises a peripherally closed press frame 3, and a press plunger 5 which is mounted, and supported so as to be slidable, on an inner flank 4 of the press frame 3 and which serves for the processing of workpieces.

The press plunger 5 is coupled in terms of drive technology to a drive, in the present case a hydraulic cylinder 6 as linear motor, and may be moved up and down by corresponding operation of the hydraulic cylinder 6 by means of a control unit (which is not explicitly shown).

The drive, that is to say the hydraulic cylinder 6, is fastened to an upper side of the press frame.

The press plunger 5 is supported and mounted, so as to be slidable, on the press frame by means of sliding elements 7, which are attached to beveled edges of the inner flanks 4, and corresponding guide elements 8 which are mechanically connected to the press plunger 5 and which are beveled correspondingly to the edges. By means of the mounting of the press plunger by means of four beveled sliding edges which are situated opposite one another in each case in pairs, substantially tilt-free support may be realized.

The press module 1 has, adjoining the movement space of the press plunger 1, a working space 9 in which a workpiece for processing may be positioned during operation.

Two recesses 10 are formed, so as to adjoin the working space 9 and so as to communicate with the working space 9, on the press frame 3. The recesses 10 extend laterally outward to both sides of the working space 9.

Figure 8:
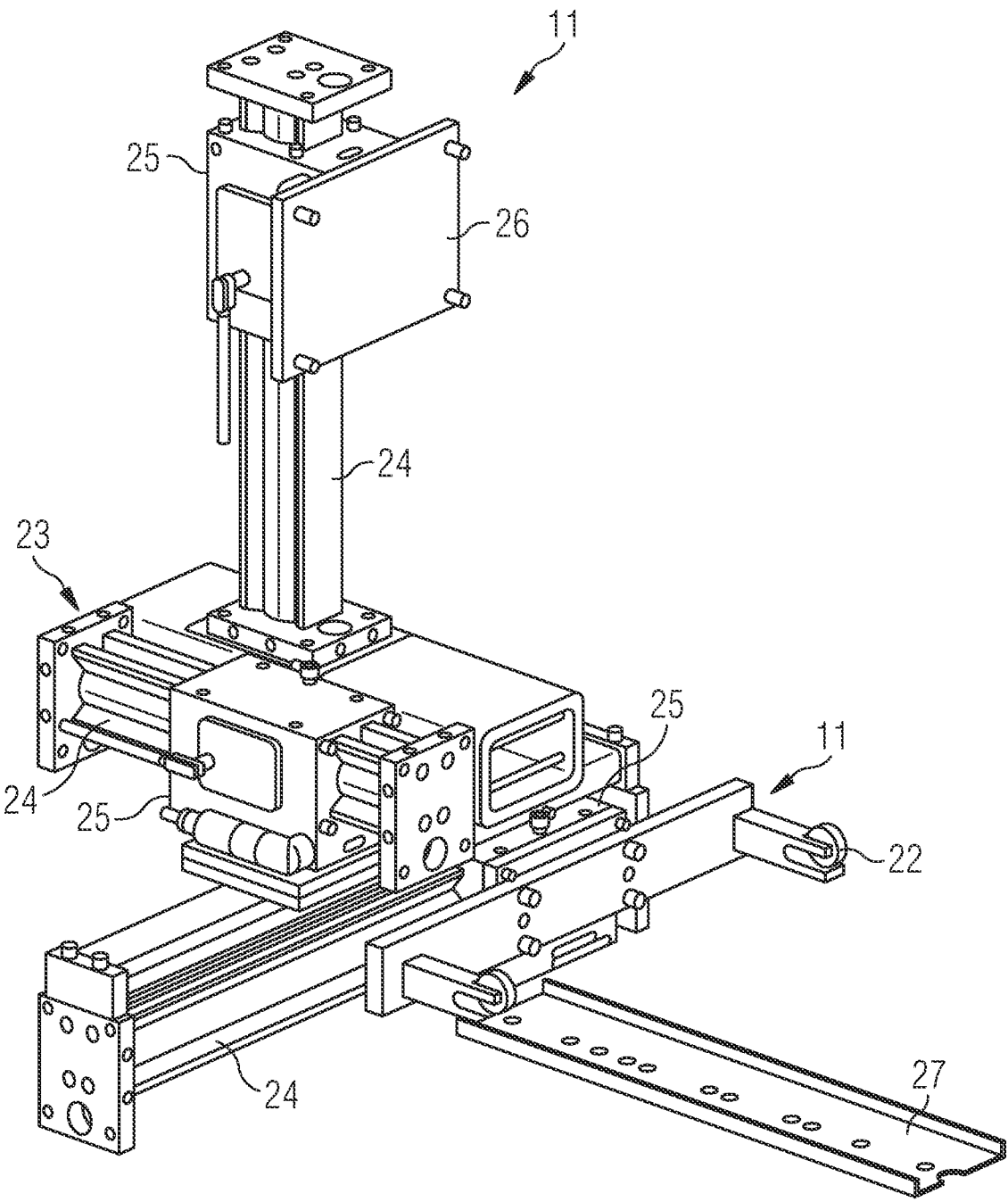
FIG. 8 shows a manipulator unit of the press module.

A first manipulator device 11 as shown in FIG. 8 is arranged or mounted in each of the recesses 10 for the purposes of transporting workpieces into and out of the working space 9.

Furthermore, a press table 12 is present or formed, opposite the press plunger 5, on the press frame.

In the embodiment according to the figures, the spaces for receiving the press plunger 5, the press table 12, the working space 9, and, furthermore, the recesses 10, respectively formed within the press frame 3, are formed as apertures extending through the press frame 3, that is to say corresponding locations on the press frame 3 are formed as passages extending through the press frame 3, whereby, for example, the accessibility to the components of the press module 1 may be improved and the weight of a press module 1 may be optimized, which is advantageous in particular with regard to the modular exchangeability of the press modules 1.

Figure 3:
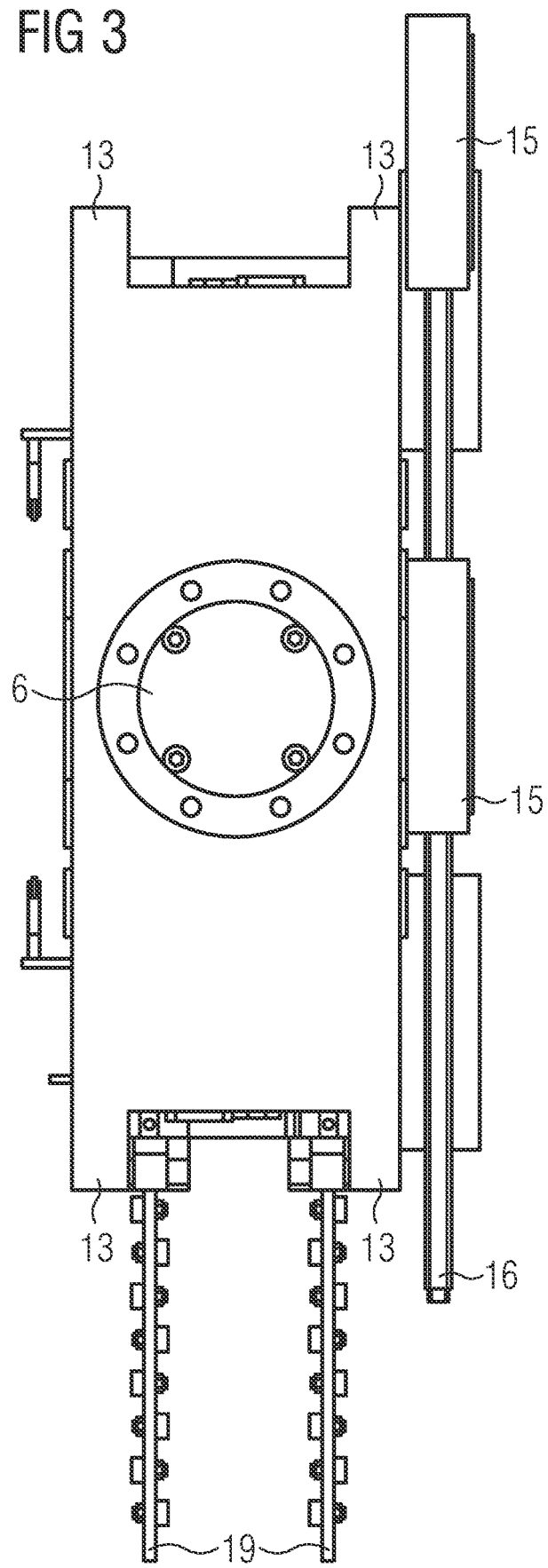
FIG. 3 shows the press module of FIG. 1 in a view from above.

At the narrow sides, the press frame 3 may have in each case two flanges 13 which project at the press frame edges, such that the narrow sides have an outwardly open U-shaped cross section. By means of a corresponding form of the narrow sides, it is possible in particular to achieve a compromise between reduced weight, sufficient torsional stiffness and stability of the press frame. The narrow sides of U-shaped cross section resulting from the flanges 13 may be clearly seen in the plan view shown in FIG. 3.

The press frame 3 of the present embodiment is of symmetrical form in relation to a central plane running through the working axis A of the press plunger 5, which may be advantageous with regard to the assembling of multiple press modules 1 in a press line 2 and with regard to the modularity and modular exchangeability, proposed herein, of press modules 1.

The press module 1 furthermore comprises a second manipulator device 14 which is attached to, in particular flange-mounted on, the press frame 3 at a wide side B, lying transversely with respect to the feed direction R, of the press frame 3, and which in the present example is positioned upstream of the working space 9 in the feed direction R. As seen in a front view, the second manipulator device 14 is attached at least partially below the working space. The fastening of the second manipulator device 14 at least partially above the working space, in particular to the press frame, for example with corresponding grippers for gripping a workpiece or other components, is likewise possible.

The second manipulator device 14 comprises two manipulators which, in the present case, are formed as displacement carriages 15. The displacement carriages 15 are, in the present exemplary embodiment, coupled to a linear guide 16 running parallel to the wide side B, in particular a linear guide rail with corresponding drives, in particular linear drives. The linear guide 16 and the displacement carriages 15 are designed such that the displacement carriages are displaceable in a synchronous manner parallel to the wide side 15, such that one of the displacement carriages 15 may be positioned at the working space 9 while the second displacement carriage is positioned at a laterally outer end of the linear guide 16, for example at least partially outside the press frame 3.

By means of the second manipulator device 14, it is possible, for example during ongoing operation of the press module 1, for a workpiece to be moved outwards, for example transferred outwards, by virtue of the deposit carriage 15, or displacement carriage, situated at the working space 9 being moved outwards with a workpiece situated thereon. At the same time, the deposit carriage 15 situated at the outside may be moved inwards to the working space 9, and may be used there for the deposit or receiving of a workpiece.

Furthermore, by means of the second manipulator device 14, an additional element, for example a construction element such as a threaded element and the like, may be fed to the working space 9, for example in order to be connected to or integrated into a workpiece in a processing step.

The second manipulator device 14 may also be used, as already described above, for integrating additional process steps, such as for example rotation of the workpiece, marking of the workpiece, welding, cutting etc.

Figure 2:
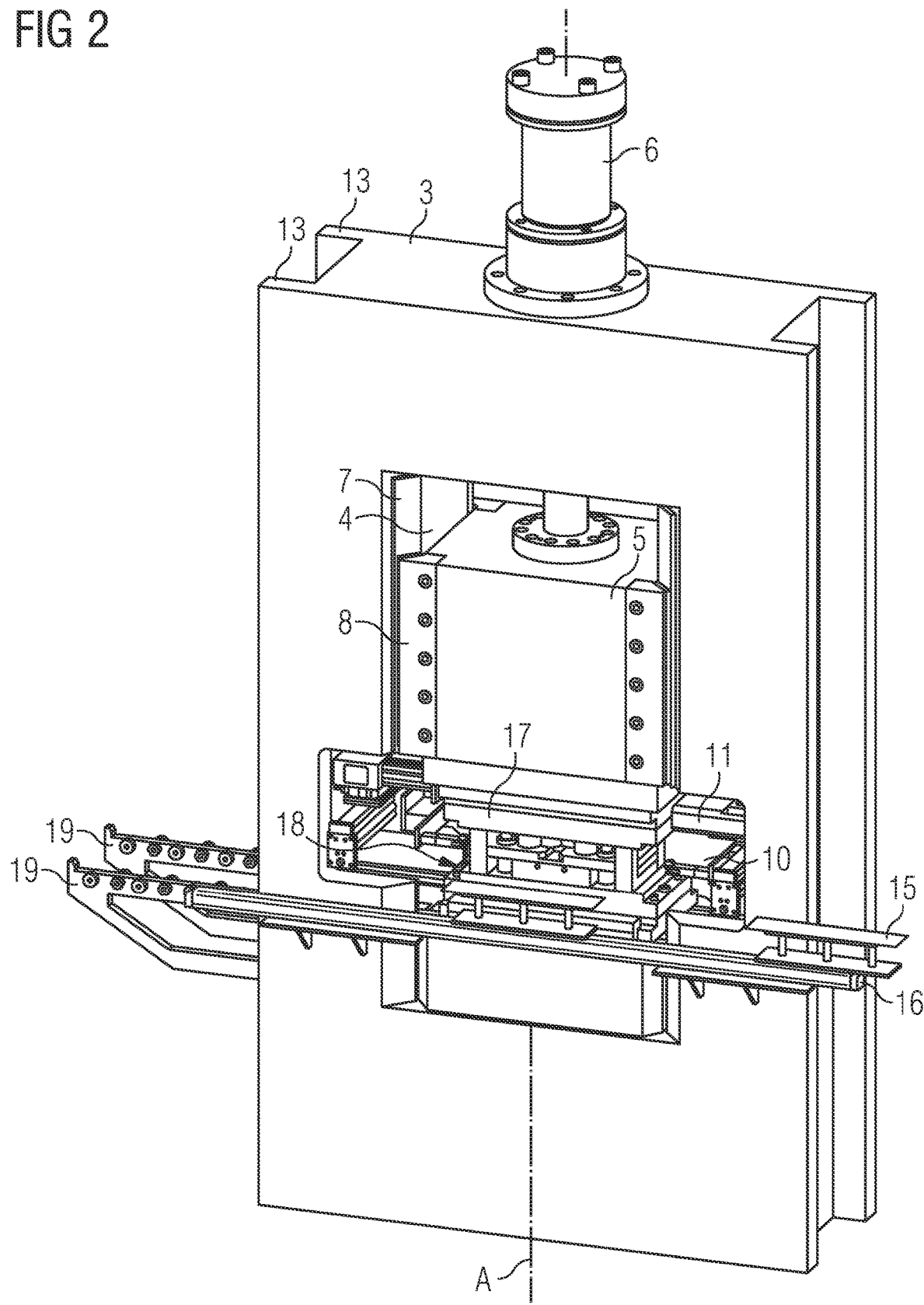
FIG. 2 shows the press module as per FIG. 1 with inserted press tools.

FIG. 2 shows the press module 1 with inserted tools, wherein an upper tool 17 is coupled to the press plunger 5 and a lower tool 18 is coupled to the press table 12.

For the change of the tools 17, 18, the press module 1 furthermore comprises spherical-roller rails 19 fastened to one side, in particular narrow side, of the press frame 3, wherein the spherical-roller rails 19 are provided and designed to move the upper and lower tools 17, 18 into the working space 9 and out of the latter during a tool change.

Figure 4:
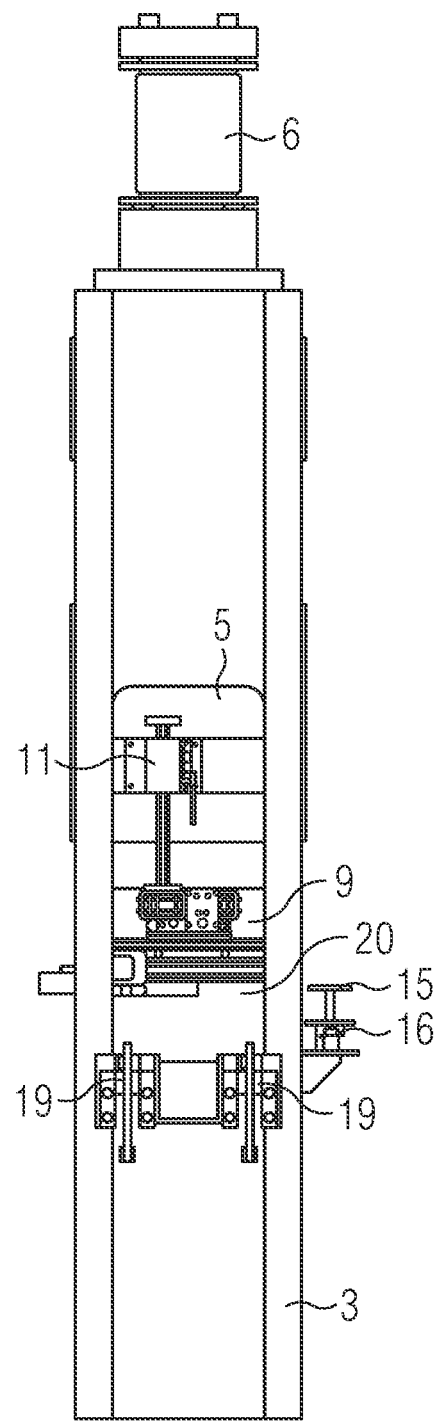
FIG. 4 shows the press module of FIG. 1 in a side view.
Figure 5:
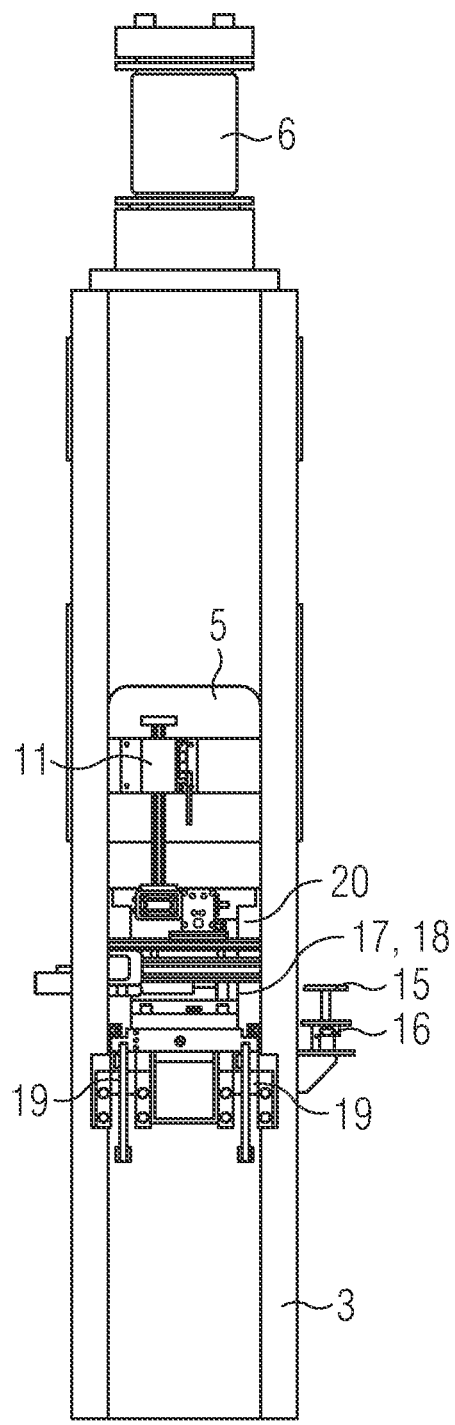
FIG. 5 shows the press module of FIG. 2 in a side view.

FIG. 4 and FIG. 5 show side views of the press module 1, wherein it can be seen from these side views that the press frame 3 has, at each lateral side (one of the lateral sides is visible in plan view in FIG. 4 and FIG. 5), at the level of the working space 9, a lateral aperture 20 which communicates with the working space 9. The lateral apertures 20 are formed such that, together with the working space 9, they form a channel which extends in a lateral direction, in particular perpendicular to the workpiece flow direction R, and which is designed such that a tool situated in the working space 9 may be removed and inserted in a lateral direction. In the present example, both apertures 20 have the same shape and the same diameter and are of symmetrical form in relation to a central plane running through the working axis A.

Figure 6:
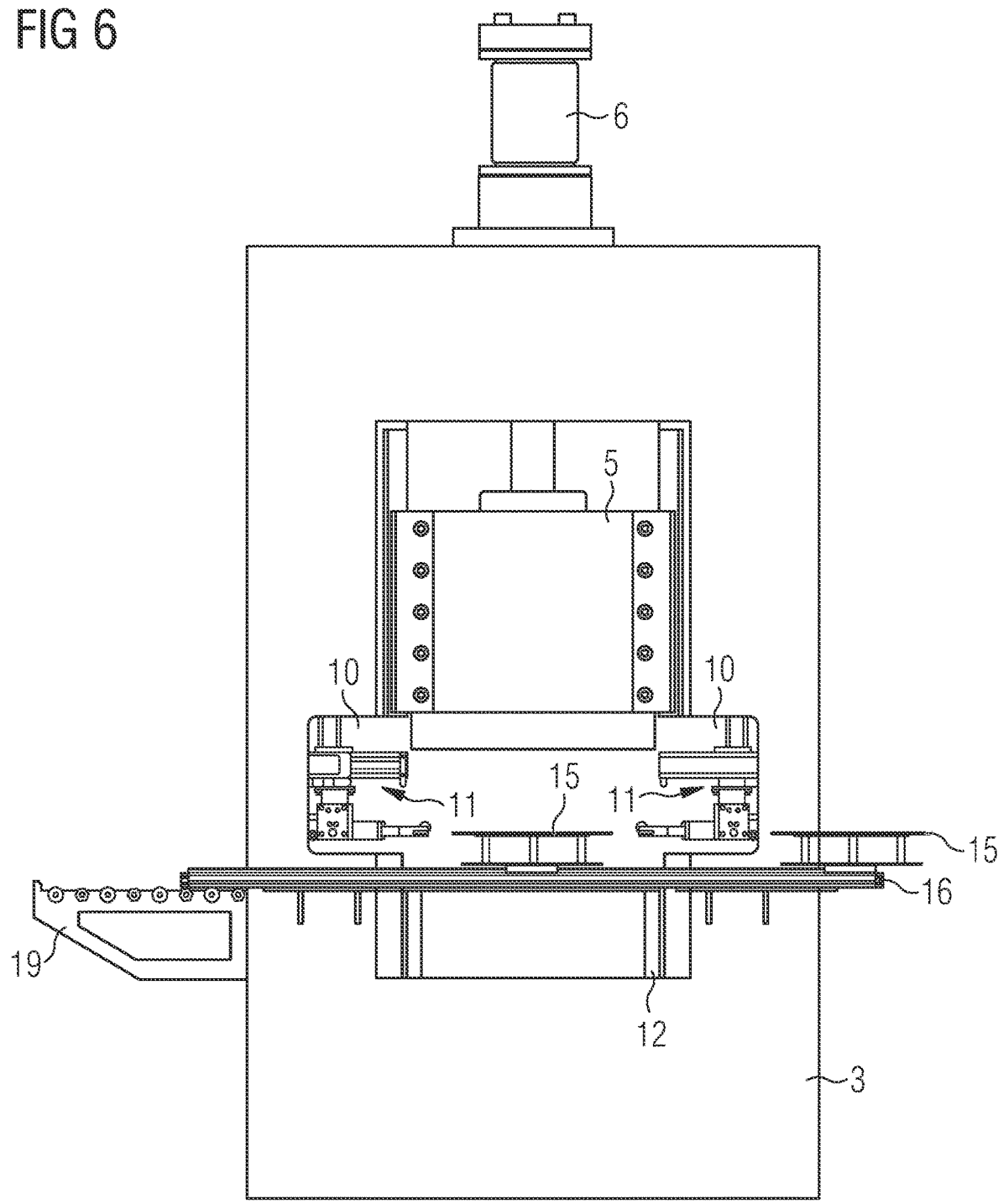
FIG. 6 shows the press module of FIG. 1 in a front view.
Figure 7:
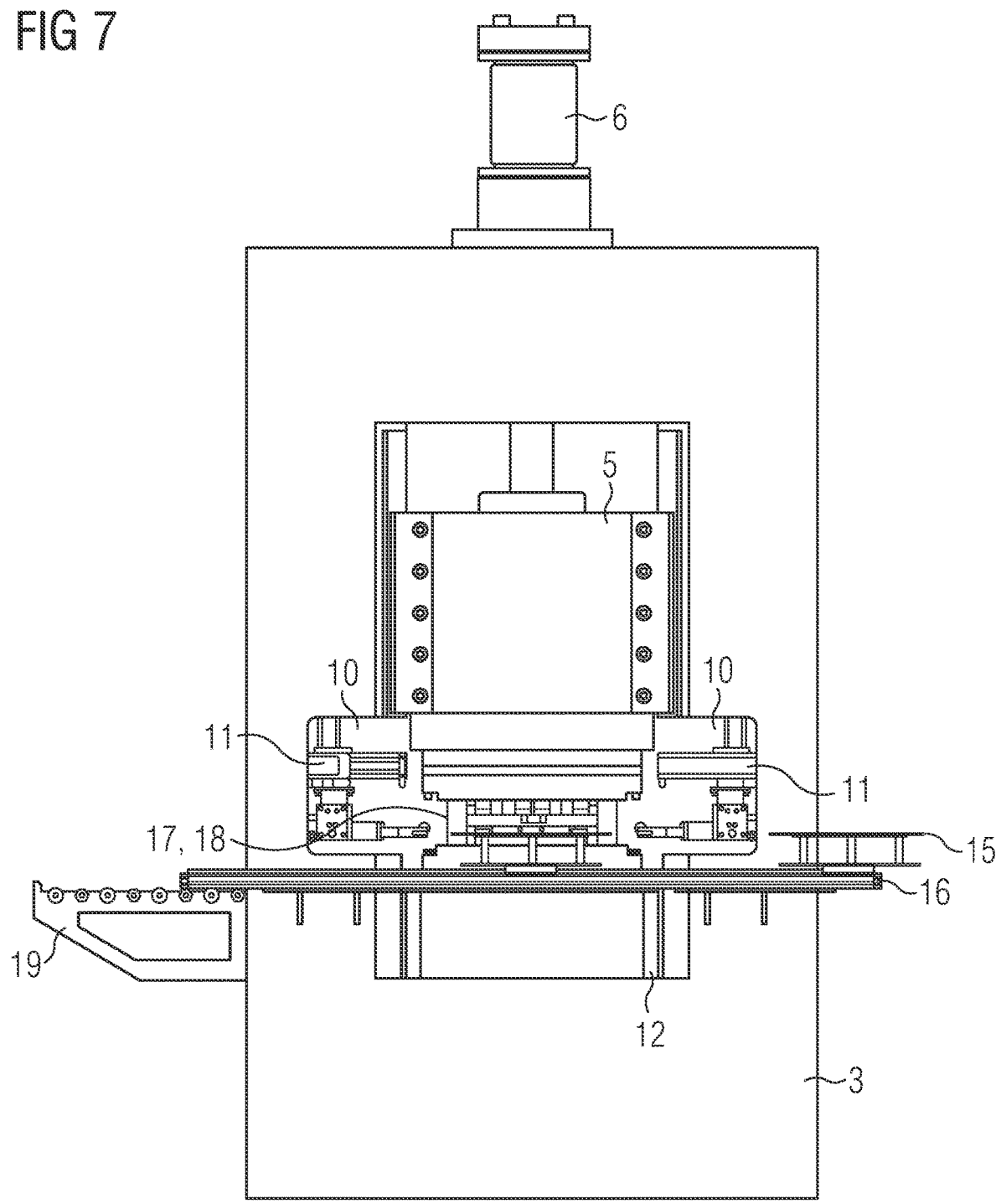
FIG. 7 shows the press module of FIG. 2 in a front view.

FIG. 6 and FIG. 7 show the press module 1 in a front view, wherein it can be clearly seen from these figures that the first manipulator devices 11 may be arranged in the recesses 10. By means of the recesses 10, it may firstly be achieved that the freedom of movement and the available movement volume for the first manipulator devices 11 is increased, resulting in advantages for the transport of workpieces into the working space 9 and out of the working space 9. It is furthermore possible to implement a relatively compact construction.

In particular, there are advantages for the placement and positioning of a workpiece on the lower tool 18, and for the removal of a workpiece from the lower tool 18.

An exemplary embodiment of a first manipulator device 11 is shown in more detail in FIG. 8. In the specific example of FIG. 8, the first manipulator device 11 comprises a manipulator 21 with one or more gripping members 22 designed for gripping a workpiece 27. The manipulator is coupled to an actuator unit 23, which in the present example permits a movement of the gripping member 22 or of the manipulator 21 in three movement directions.

Specifically, the first manipulator device 11 comprises three actuators 25 which are mounted in a linearly displaceable manner on respective linear guides 24 and which may be moved along the linear guides 24 in order to thus move the manipulator 21 or the gripping member 22.

The linear guides 24 are arranged in three mutually perpendicular directions, wherein, in the installed state, a first linear guide is oriented parallel to the working axis A, a second linear guide is oriented parallel to the workpiece flow direction R, and wherein a third linear guide is formed perpendicular thereto, and permits a movement component laterally toward and away from the working space 9.

One of the actuators 25 comprises a mounting plate 26 for cantilevered fastening to the press frame 3.

As can be seen from FIGS. 1 to 7, a first manipulator device 11 is mounted on each lateral side of the working space 9, wherein the first manipulator devices 11 are for example operable synchronously such that a workpiece 27, in the working cycle of the press module, moves in the workpiece flow direction R, may be placed for processing in the working space 9, in particular on a corresponding lower tool 18, may be removed from the respective tool 18 after the processing, and may for example be placed on a deposit carriage 15.

FIG. 9 shows a production line, by way of example on the basis of a press line 2, with multiple modularly exchangeably populatable press module installation locations P. Press module installation locations P of the press line are, in the example of FIG. 9, populated with press modules 1, wherein the press modules 1 are arranged successively one behind the other in a workpiece flow direction. The press modules 1 of the press line 2 are preferably of identical form.

In the exemplary embodiment of FIG. 9, the press line 2 comprises a feeder unit 28, by means of which a sheet-metal strip as starting material may be fed to the press modules 1 from a corresponding roll, that is to say a corresponding sheet-metal coil 29.

In the present example, a first processing unit 30 comprising two press modules 1 installed in a modularly removable manner at press module installation locations P, is positioned downstream of the feeder unit 28 in the workpiece flow direction R. The first processing unit 30 may for example be configured for working processes such as cutting and punching.

In the example of FIG. 9, a buffer unit 31 is positioned downstream of the processing unit 30 in the workpiece flow direction R, which buffer unit is designed to receive and temporarily store, that is to say buffer, workpieces 27. The buffer unit 31 may for example be designed in terms of receiving capacity such that the time required for a change of a sheet-metal coil 29 may be bridged, such that the second processing unit 32 positioned downstream of the buffer unit 31 may continue to be operated even during a change of a sheet-metal coil 29.

The second processing unit 32 comprises, by way of example, a total of nine press modules 1 which are configured to further process the stages generated by the first processing unit, for example by means of a series of forming operations, to realize the end product. The further press modules 1 of the second processing unit 32 are installed in a modularly exchangeable manner at corresponding press module installation locations P of the press line 2.

A further operative unit for receiving and for transporting away the finished workpiece is arranged downstream of the second processing unit 32 in the workpiece transport direction R.

The press modules 1 may be constructed in accordance with a press module described in conjunction with FIGS. 1 to 8, wherein the press modules 1 of the first processing unit 30 (cutting, punching etc.) may be operated with relatively short press strokes, and wherein the press modules 1 of the second processing unit (forming, bending etc.) may be operated with longer press strokes.

As already mentioned, all press modules 1 may be of identical construction (aside from the tools used). This is advantageous in particular for provision of replacement parts and exchange of modularly integrated press modules 1. In particular, it is not strictly necessary for each of the exchangeably integrated press modules 1 to hold available a respective substitute press module.

The press modules 1 of the press line 2 are arranged successively in relation to one another, such that the working spaces 9 of the processing units form, along the respective processing line, a processing channel for transporting workpieces.

The press line 2 comprises a rail system 33 with multiple rails 34 assigned to the press module installation locations, which rails are shown in FIG. 9 in the region of the processing units 30, 32. The press modules 1 are coupled to the rail system 33 by means of corresponding mechanical interfaces, which may be formed for example on the lower side of the press frame 3, for example corresponding rollers. The coupling of the press modules 1 to the rail system 33 is such that each press module 1 may be removed from the press network from the respective press module installation location by displacement along the respective rail 34. At the same time, it is possible for a further press module 1, which is for example held available as a substitute and which is populated or populatable or to be populated with corresponding tools, and which likewise is or may be coupled to the rail system 33, to be incorporated or integrated into the press network by means of the rail system 33 at a corresponding press module installation location P.

With the rail system 33, each of the press modules 1 is, in the present example, integrated, at the respective processing position or at the respective press module installation location P, as a functional unit which is exchangeable as a whole, including the manipulator devices, into the processing line. The number of exchangeably integrated or integrable press modules 1 may vary, for example depending on the type of press line 2 and type of workpiece to be manufactured.

An advantage of the modularly exchangeable press modules 1 and of the modularly exchangeable integration of the press modules 1 by means of a guide system, such as for example the rail system 33 or some other system by means of which the press modules may be easily and quickly exchanged, consists in that servicing and repair of a press module 1 may, after removal from the press assembly, be performed outside the press line 2. By insertion of a substitute press module, the press line 2 may continue to be operated substantially without major interruptions, such that the downtimes of the press line 2 required for example for servicing and repair may be considerably reduced. It is also possible for a defective press module to be replaced in a simple manner and without long interruptions in the production process.

It is furthermore possible for the press line 2 to be comparatively easily converted, for example for manufacturing a workpiece of a different type, or in conjunction with the incorporation of another modular processing unit or of another modular press module, that is to say of a modularly exchangeable press module, in place of a modularly exchangeably integrated press module 1 or a corresponding processing unit. In particular, processing steps may be exchanged, interchanged, supplemented and/or varied, for example by exchange or variation of the sequence or arrangement of the press modules 1 of the processing stations along the processing line.

The press line 2 may be operated in accordance with the manner described further above, wherein reference is made in particular to the above discussion in connection with the exchange or change of press modules 1. Furthermore, reference is made to the above discussion made in connection with the try-out presses and the setup of control, press and process parameters, which are correspondingly applicable.

The rail system 33 of the exemplary embodiment of FIG. 9 comprises a multiplicity of rails 34 which are arranged along the processing line and which are arranged transversely, in particular perpendicularly, with respect to the processing line, that is to say workpiece flow direction R. It is thus possible for individual press modules 1, which are modularly integrated at respective press module installation locations, to be moved out of the press network transversely with respect to the processing line. At a press module 1 which has been moved out, various components, such as for example press plunger 5, press table 12, the manipulator devices 11, 14 etc., are better accessible. Brief servicing work may be performed relatively easily in the case of a press module 1 which has been moved out. A removed press module 1, that is to say a press module 1 which has been moved out by means of the rail system 33, may also be replaced with another, in particular identically set-up, further press module 1. With regard to advantages, reference is made to the discussion above.

The rail system 33 may extend substantially in any desired manner proceeding from the press line 2. In particular, the press line 2 may be connected to or populated with a magazine with reserve or replacement press modules or other processing units by way of the rail system 33, such that, for example, individual press modules 1 may be exchanged for other press modules and/or processing units at any time. It is also possible for other processing units, for example for welding, cutting or marking operations etc., to be coupled or couplable to the rail system 33, such that these further processing units may also be integrated in modularly exchangeable fashion into the press line 2.

Furthermore, the guide system, in particular the rail system 33, may be configured such that multiple processing centers or press lines may be connected to one another, such that individual press modules 1 between the processing centers may be exchanged, and the processing centers may be configured in a correspondingly flexible manner.

Preferably, the individual press modules 1 have dedicated control units which permit autonomous operation of an individual press module 1, and which are preferably configured so as to be controllable synchronously by means of a superordinate master controller in a press network.

In the press network, for example in the case of integration into a press line 2 of FIG. 9, the control units of the press modules 1 may be connected to a superordinate master control unit which is configured for controlling all of the processing units and for synchronizing the operation of all processing units of the press line 2.

By virtue of the fact that the press modules may be configured with different operating modes, in particular corresponding to stand-alone operation and operation in the press network, it is possible, for example in the case of a correspondingly configured guide system, in particular the rail system 33, to selectively set up processing centers with individual press modules 1 in stand-alone operation or processing centers with multiple press modules 1 combined with one another in network operation.

In embodiments, further processing units, such as for example material feed, transporting-away of workpieces, buffer units etc., may likewise be designed to be movable by means of a or the guide system, in particular the rail system 33, and integrable in modularly exchangeable fashion into the press line 2, such that flexible setup of a processing center is possible.

The rail system 33 shown in conjunction with FIG. 9 allows the press modules 1 to be slid out laterally. In embodiments, the rail system 33, or some other guide system, may be configured such that a displacement of one or more press modules 1 or respective processing units is also possible parallel to the processing line. This yields further advantages and facilitations for the setup of a press line or of a processing center.

Figure 10:
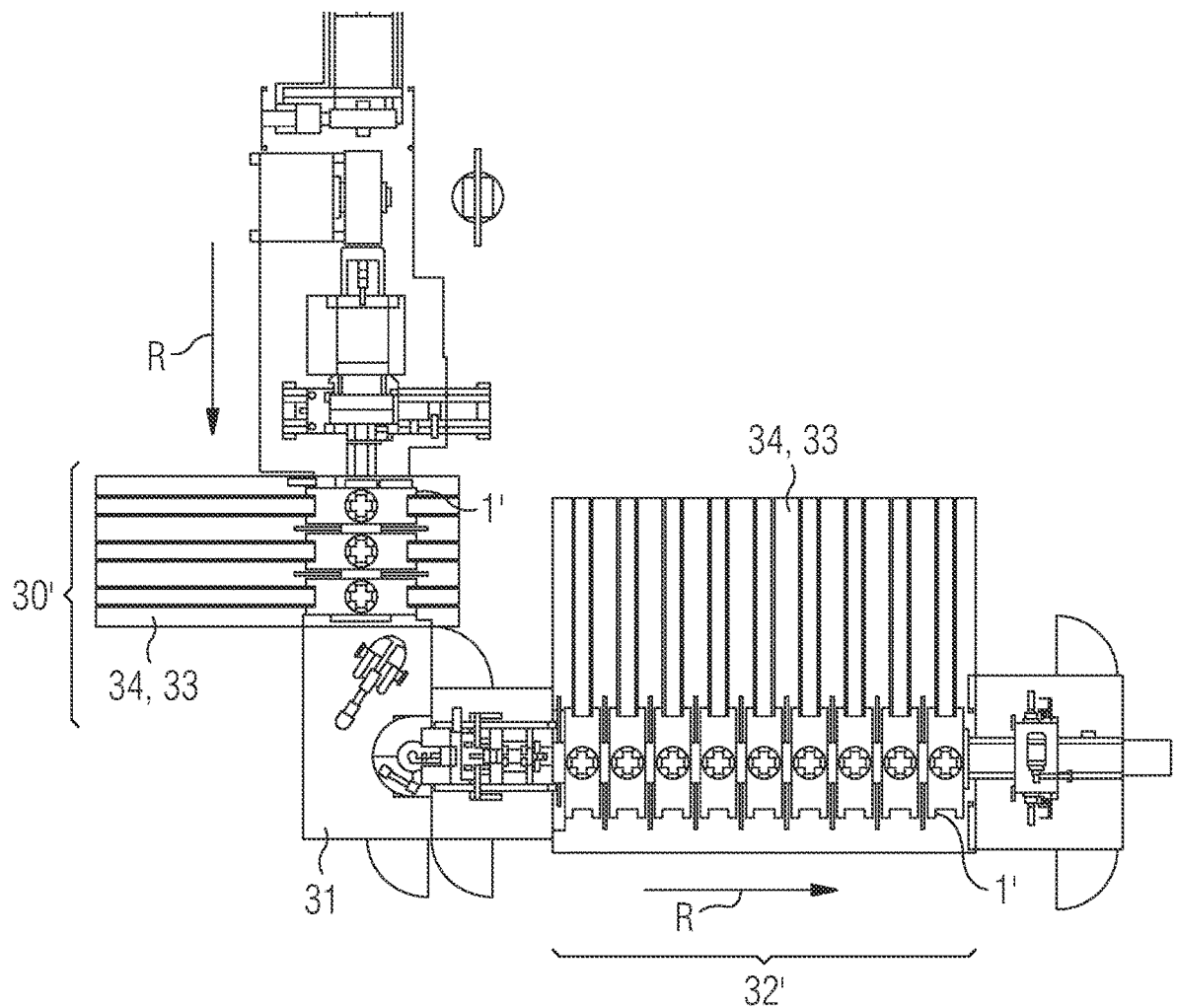
FIG. 10 shows a production system with production modules, which production system is designed in a configuration with an angled production line and interposed buffer unit.

FIG. 10 shows a production system with production modules 1' which is designed in a configuration with an angled production line 2' and an interposed buffer unit 31.

The production modules 1' are installed or designed in modularly exchangeable fashion analogously to the press modules 1 of the press line 2 of FIG. 9. In particular, the production modules 1' may, on the basis of rails 34, be removed from the production network and inserted, or replaced, transversely, in particular locally in each case perpendicularly, with respect to the production line.

In the example of FIG. 10, the production line 2' is designed in an angled configuration, wherein a first partial production line 30' with multiple production modules 1' connected in series is arranged substantially perpendicular to a second partial production line 32', in turn comprising multiple production modules 1' connected in series.

The production modules 1', in particular some of the production modules 1', may in particular be designed such that a deposit unit as described further above, in particular functioning as an intermediate store, is arranged or present at least between two, or at least between multiple, preferably in each case between two, production modules of the production line 2', for example of the first or second partial production line 30', 32', which are arranged in immediate succession in the production direction R. Thus, between the successive production modules 1', workpiece transport between the production spaces 9 thereof is possible by means of the deposit unit. By means of the deposit unit, for example by means of corresponding manipulators, or tools, it is possible for manipulating operations such as rotating or turning, or intermediate production steps, to be performed. Furthermore, it is possible for workpieces to be transferred out and/or for workpiece components to be transferred in.

At the end of the production line 2' in terms of the production process, there may be provided an end store 35, at or by means of which the workpieces that have passed through the production line 2' may be stored or discharged. Each of the partial production lines 30' and 32' may itself in turn be regarded as an independent production line 2' in the context of the invention, in particular because each of the partial production lines 30' and 32' comprises at least one production module 1' with a deposit unit which is designed as an intermediate store and which permits intermediate depositing or intermediate positioning of a workpiece between production spaces which are arranged in immediate succession in the production direction R.

It is evident that the production modules proposed herein for modular exchangeable integration into a production line with one or more modularly populatable production module installation locations offer in particular the advantages in terms of production and plant technology mentioned in the introduction.

The features and embodiments described herein in conjunction with production modules, production lines and production module installation locations apply in particular to, and are in particular applicable in the case of, press modules, press lines and press module installation locations.

LIST OF REFERENCE DESIGNATIONS

1 Press module
1' Production line
2 Press line
2' Production line
3 Press frame
4 Inner flank
5 Press plunger
6 Hydraulic cylinder
7 Slide element
8 Guide element
9 Working chamber
10 Recess
11 First manipulator device
12 Press table
13 Flange
14 Second manipulator device
15 Deposit carriage
16 Linear guide
17 Upper tool
18 Lower tool
19 Spherical-roller rails
20 Lateral aperture
21 Manipulator
22 Gripping member
23 Actuator unit
24 Linear guide
25 Actuator
26 Mounting plate
27 Workpiece
28 Feeder unit
29 Sheet-metal coil
30 First processing unit
30' First partial production line
31 Buffer unit
32 Second processing unit
32' Second partial production line
33 Rail system
34 Rail
35 End store
A Working axis
B Wide side
P Press module installation location
R Workpiece flow direction

I claim:

1. A production module, designed for executing at least one production step in a method for producing a workpiece, and configured for integration into a modular production system with multiple production modules which are arranged successively in relation to one another along a production line, and which have production spaces for forming a production channel running along the production line, comprising:
   a frame; and
   at least one manipulator unit;
   wherein:
   the manipulator unit comprises, upstream or downstream of the production module in the direction of the production line, a deposit system with at least one deposit unit for depositing a workpiece or a workpiece component;
   the deposit system is configured such that a workpiece or a workpiece component is, during the production process, transferable between a deposit position of the deposit unit and a production position in the production space of a production module; and
   for the execution of a production step, the production module is positioned directly downstream in a production direction (R) along the production line;
   the deposit system comprises a linear guide rail and at least one displacement carriage;
   the linear guide rail is attached to a side of the frame that is oriented in the direction of the production line, and runs perpendicular to a production direction (R) along the production line; and
   the at least one displacement carriage is
     positioned upstream or downstream of the frame in the production direction along the production line; and
     is coupled to the linear guide rail with corresponding linear drives to be moveable along the linear guide rail perpendicularly to the production direction (R) along the production line.

2. The production module as claimed in claim 1, wherein:
   the at least one displacement carriage enables a workpiece or a workpiece component to be movable, outward away from the production line or inward toward the production line, between a deposit position assigned to the production space and at least one further deposit position which is laterally spaced apart from the production line.

3. The production module as claimed in claim 2, wherein:
the manipulator unit comprises at least two, displacement carriages;
the displacement carriages are, each movable, laterally perpendicularly with respect to the production line, in synchronized fashion, between:
a first position, which is assigned to the production space or to the production line, and
at least one second position, which is laterally averted from the production space or the production line, or at least one second position which is situated laterally at least partially outside the production channel of the production line.

4. The production module as claimed in claim 1, comprising:
a further manipulator unit configured for transferring the or a workpiece or the or a workpiece component between:
the deposit position of a deposit unit positioned upstream and/or downstream of the production module, and
the production position in the production space of the respective production module.

5. The production module as claimed in claim 1, wherein the deposit system is configured to:
execute separate and/or additional process functions, including at least one of: (i) rotating, (ii) marking, and (iii) performing process and/or quality control on workpieces or workpiece components; and/or
transfer in or transfer out workpieces or workpiece components.

6. The production module as claimed in claim 1, further comprising:
a mechanical connecting unit for the exchangeable mechanical coupling of the production module to a platform assigned to the production line;
wherein the platform comprises multiple production module installation locations (P), which are modularly populatable with production modules, for the exchangeable positioning and setting-up of production modules;
wherein the production modules are arranged successively one behind the other along the production line.

7. The production module as claimed in claim 1, further comprising:
a control interface configured for exchangeably detachable coupling in terms of control technology to a corresponding complementary control interface of the production system;
wherein the control interface and the complementary control interface are configured for:
the exchange of, control and/or process signals relating to, the operation of the manipulator unit, and/or
the execution of a production operation by means of a production unit of the production module.

8. The production module as claimed in claim 1, further comprising:
a control unit for the control of the production module for the execution of production operations;
wherein:
the control unit is operable in an operating mode as a slave control unit for implementing control commands of a master controller; and
the master controller is superordinate in terms of control technology, of the production system.

9. The production module of claim 1, wherein the production module is a press module for the forming, of workpieces composed at least partially of metal and is configured for modular integration into a production line which is in the form of a press line, and which has at least one production module installation location (P) in the form of a modularly populatable press module installation location (P), and which has multiple processing stations; and wherein the frame is a peripherally closed press frame;, comprising:
at least one press plunger which is movably mounted on the press frame and which is designed for the forming of workpieces;
a drive which, at one side, is coupled in terms of drive to the press plunger and, at the other side, is fastened to the press frame;
a working space, which is assigned to the press plunger and which is formed within the press frame and which is configured for the forming of workpieces, as production space; and
a first manipulator unit which is fastened to the press frame and which has at least one first manipulator for workpieces, wherein:
the first manipulator unit or the at least one first manipulator is:
arranged at least partially in at least one recess adjoining the working space; and
extends laterally outward transversely with respect to the movement axis (A) of the press plunger.

10. The production module as claimed in claim 9, further comprising:
a mechanical connecting unit for the exchangeable mechanical coupling of the press module to a platform assigned to a press line, wherein the platform comprises multiple press module installation locations (P) that are modularly populatable with press modules, for the exchangeable positioning and setting-up of press modules; and/or
an electrical, or electronic, interface configured for exchangeably detachable coupling to a corresponding counterpart interface of the press line.

11. A production system comprising:
two or more production modules; and
two or more, modularly exchangeably populatable production module installation locations (P) which is/are each modularly exchangeably populatable with one of the two or more production modules;
wherein the production module is designed for executing at least one production step in a method for producing a workpiece, and configured for integration into a modular production system with multiple production modules which are arranged successively in relation to one another along a production line, and which have production spaces for forming a production channel running along the production line, comprising:
a frame; and
at least one manipulator unit;
wherein:
the manipulator unit comprises, upstream or downstream of the production module in the direction of the production line, a deposit system with at least one deposit unit for depositing a workpiece or a workpiece component;
the deposit system is configured such that a workpiece or a workpiece component is, during the production process, transferable between a deposit position of the deposit unit and a production position in the production space of a production module; and for the execution of a production step, the production module is positioned directly downstream in a production direction (R) along the production line;

the deposit system comprises a linear guide rail and at least one displacement carriage;

the linear guide rail is attached to a side of the frame that is oriented in the direction of the production line, and runs perpendicular to a production direction (R) along the production line; and the at least one displacement carriage is
- positioned upstream or downstream of the working space in the production direction along the production line; and
- is coupled to the linear guide rail with corresponding linear drives to be moveable along the linear guide rail perpendicularly to the production direction (R) along the production line.

12. The production system as claimed in claim 11, wherein at least one production module installation location (P) is modularly exchangeably populatable or populated with a production module for subtractive, formative and/or additive production of a workpiece.

13. The production system as claimed in claim 11, further comprising:
a first control unit configured as a master controller and configured in terms of control technology for communication with a second control unit;
wherein:
the second control unit is operable as a slave controller, of at least one of the production modules; and
the second control unit is optionally selectively operable independently of the master controller.

14. A production system, comprising:
at least two modularly exchangeable press modules, which are arranged along a processing line at corresponding press module installation locations (P) and which serve for the processing of workpieces, for the formative processing of workpieces composed at least partially of meta;
wherein:
each of the press modules comprises a press frame and a driveable press plunger movably mounted therein;
each press plunger is assigned a working space which is designed for the processing of workpieces;
the press modules are arranged successively in relation to one another such that the working spaces form a processing channel along the processing line;
the press modules are arranged at processing positions, which are fixedly predefined for a respective operating mode, along the processing line; and
at least one of the press modules is integrated, as a unit which is exchangeable as a whole, into the processing line at the respective processing position at the corresponding press module installation location (P);
wherein the at least one of the press modules comprises: at least one manipulator unit;
wherein:
the manipulator unit comprises, upstream or downstream of the press module in the direction of the production line, a deposit system with at least one deposit unit for depositing a workpiece or a workpiece component;
the deposit system is configured such that a workpiece or a workpiece component is, during the production process, transferable between a deposit position of the deposit unit and a production position in the production space of a production module; and for the execution of a production step, the production module is positioned directly downstream in a production direction (R) along the production line;

the deposit system comprises a linear guide rail and at least one displacement carriage;

the linear guide rail is attached to a side of the press frame that is oriented in the direction of the production line, and runs perpendicular to a production direction (R) along the production line; and the at least one displacement carriage is
- positioned upstream or downstream of the press frame in the production direction along the production line; and
- is coupled to the linear guide rail with corresponding linear drives to be moveable along the linear guide rail perpendicularly to the production direction (R) along the production line.

15. The production system as claimed in claim 14, further comprising:
at least two mounting pedestals designed for exchangeably receiving a press module;
wherein:
a respective press module comprises at least one mounting interface designed for mechanical coupling to the mounting pedestal;
the mounting pedestal and the mounting interface comprise mutually corresponding coupling elements by means of which a respective press module may be exchangeably integrated into the processing line;
the mounting pedestal is designed as a tray-like insert or comprises such an insert, wherein the insert is designed such that one of the press modules may be removed from the press line in a direction transverse, to the processing line;
the insert comprises a guide system, by means of which in each case one of the press modules is couplable and displaceable transversely with respect to the processing line, such that a respective press module is: (i) removable and insertable transversely in relation to the processing line; and/or (ii) is positionable such that its working space is situated in alignment with the processing channel, or is situated outside the processing line.

16. The production system as claimed in claim 14, further comprising:
a control interface which is coupled via a wired or wireless data communication means to a press line controller; and
wherein the control interface serves for:
wired or wireless, coupling in terms of signal technology to a complementary interface of a press module which is modularly exchangeably integrated at a press module installation location (P); and
transmission of control commands and/or operating parameters of the press module.

17. The production system as claimed in claim 14, wherein at least one of the modularly exchangeable press modules comprises:
a press module controller by means of which the operation of the components of the press module is at least partially, controllable; and/or
a monitoring unit for receiving, for acquiring and for data processing of operating parameters of the individual, modularly exchangeable press modules.

* * * * *